United States Patent
Huang et al.

(10) Patent No.: US 9,594,245 B2
(45) Date of Patent: Mar. 14, 2017

(54) ADJUSTMENT METHOD FOR ADAPTIVE OPTICS SYSTEM, ADAPTIVE OPTICS SYSTEM, AND STORAGE MEDIUM STORING PROGRAM FOR ADAPTIVE OPTICS SYSTEM

(71) Applicant: HAMAMATSU PHOTONICS K.K., Hamamatsu-shi, Shizuoka (JP)

(72) Inventors: Hongxin Huang, Hamamatsu (JP); Takashi Inoue, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/895,588

(22) PCT Filed: May 29, 2014

(86) PCT No.: PCT/JP2014/064294
§ 371 (c)(1),
(2) Date: Dec. 3, 2015

(87) PCT Pub. No.: WO2014/196448
PCT Pub. Date: Dec. 11, 2014

(65) Prior Publication Data
US 2016/0131901 A1 May 12, 2016

(30) Foreign Application Priority Data

Jun. 6, 2013 (JP) .................................. 2013-119852

(51) Int. Cl.
*G02B 27/00* (2006.01)
*G02B 26/06* (2006.01)
(Continued)

(52) U.S. Cl.
CPC ............ *G02B 27/0068* (2013.01); *G01J 9/00* (2013.01); *G01M 11/02* (2013.01); *G02B 26/06* (2013.01);
(Continued)

(58) Field of Classification Search
CPC ....... G02B 27/0068; G02B 26/06; G01J 9/00; G02F 1/01; G02F 1/13
(Continued)

(56) References Cited

U.S. PATENT DOCUMENTS 8,158,917 B2 *  4/2012  Li .............................. G01J 9/00
                                                    250/201.9
2006/0049331 A1 *  3/2006  Smith ................... G01J 1/4257
                                                    250/201.9
(Continued)

FOREIGN PATENT DOCUMENTS

JP    H09-15057 A    1/1997
JP    2009-162614 A    7/2009
(Continued)

OTHER PUBLICATIONS

Jason Porter et al., "Adaptive Optics for Vision Science, Principles, Practices, Design, and Applications" Chapter 18—Design and Testing of a Liquid Crystal Adaptive Optics Phoropter, Wiley Interscience, 2006, pp. 496-499.
(Continued)

*Primary Examiner* — Seung C Sohn
(74) *Attorney, Agent, or Firm* — Drinker Biddle & Reath LLP

(57) ABSTRACT

An adaptive optics system includes a spatial light modulator configured to spatially modulate a phase of an optical image incident on a modulation surface and a wavefront sensor including a lens array having a plurality of two-dimensionally arranged lenses and an optical detection element for
(Continued)

detecting a light intensity distribution including converging spots formed by the lens array and configured to receive the optical image after the modulation from the spatial light modulator, and compensates for wavefront distribution by controlling a phase pattern displayed in the spatial light modulator based on a wavefront shape of the optical image obtained from the light intensity distribution, wherein a correspondence relation between the modulation surface and the wavefront sensor is adjusted.

9 Claims, 37 Drawing Sheets

(51) Int. Cl.
  *G02F 1/01* (2006.01)
  *G01M 11/02* (2006.01)
  *G02F 1/13* (2006.01)
  *G01J 9/00* (2006.01)
(52) U.S. Cl.
  CPC ............... *G02F 1/01* (2013.01); *G02F 1/13* (2013.01); *G02F 2203/18* (2013.01)
(58) Field of Classification Search
  USPC ..................................................... 250/201.9
  See application file for complete search history.

(56) References Cited

U.S. PATENT DOCUMENTS

| | | | |
|---|---|---|---|
| 2006/0175528 A1* | 8/2006 | Greenaway | G01J 9/00 250/201.9 |
| 2008/0265130 A1* | 10/2008 | Colomb | G01J 9/02 250/201.9 |

FOREIGN PATENT DOCUMENTS

| | | |
|---|---|---|
| JP | 2010-261810 A | 11/2010 |
| JP | 2013-250525 A | 12/2013 |

OTHER PUBLICATIONS

Hongxin Huang et al., "Adaptive aberration compensation system using a high-resolution liquid crystal on silicon spatial light phase modulator," Proceedings of SPIE, Dec. 3, 2008, pp. 71560E-1-71560E-10, vol. 7156.

Abdul Awwal et al., "Characterization and Operation of a Liquid Crystal Adaptive Optics Phoropter," Proceedings of SPIE, Dec. 31, 2003, pp. 104-122, vol. 5169.

Jason Porter et al., "Adaptive Optics for Vision Science, Principles, Practices, Design, and Applications" Chapter 18—Design and Testing of a Liquid Crystal Adaptive Optics Phoropter, Wiley Interscience, 2006, pp. 477-509.

International Preliminary Report on Patentability dated Dec. 17, 2015 for PCT/JP2014/064294.

* cited by examiner

Fig.9
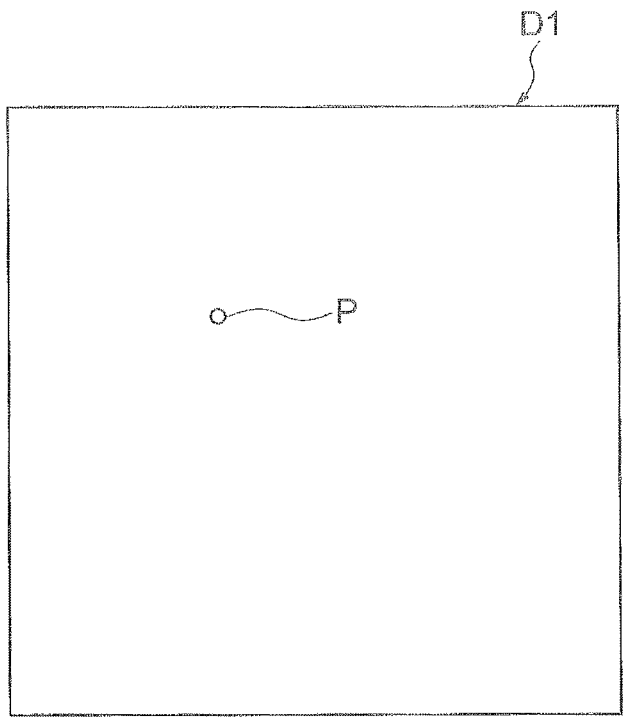
(a)
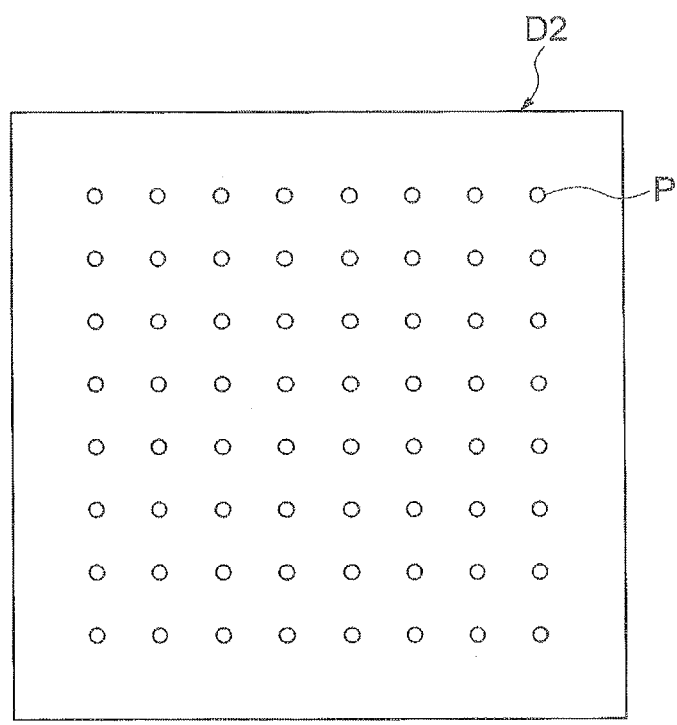
(b)

Fig.25
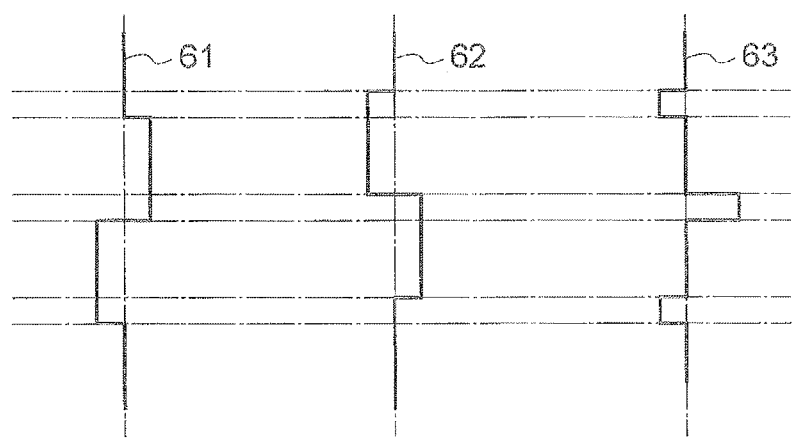
(a)
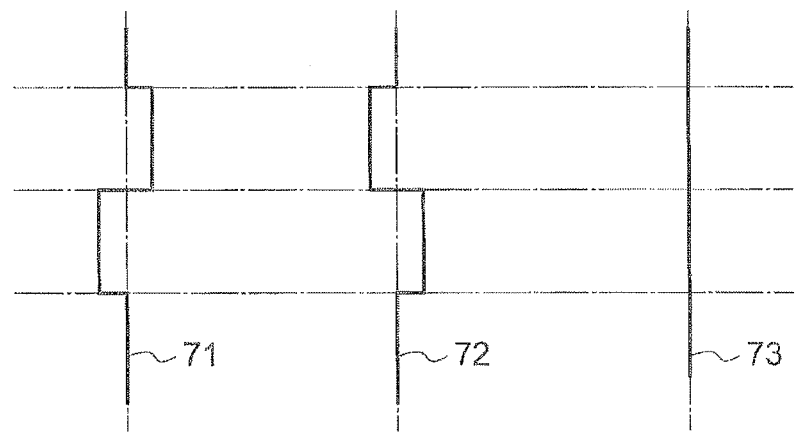
(b)

Fig. 27
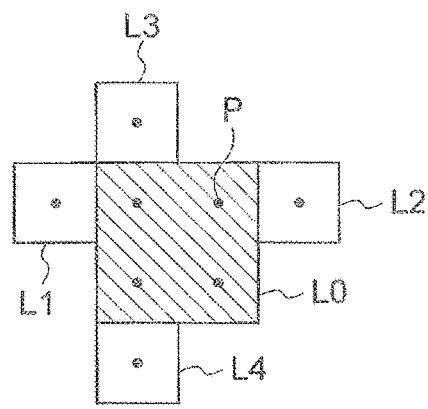
(a)
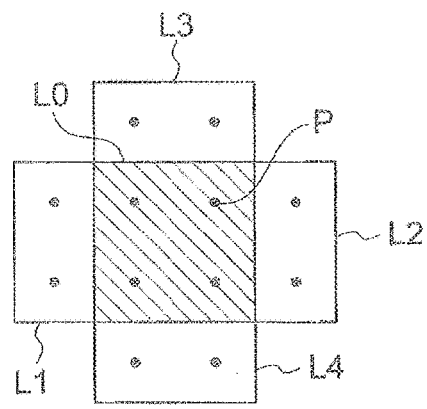
(b)
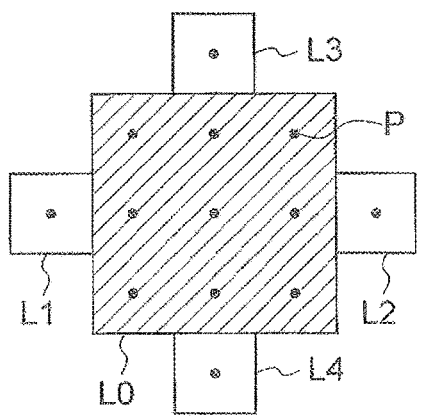
(c)
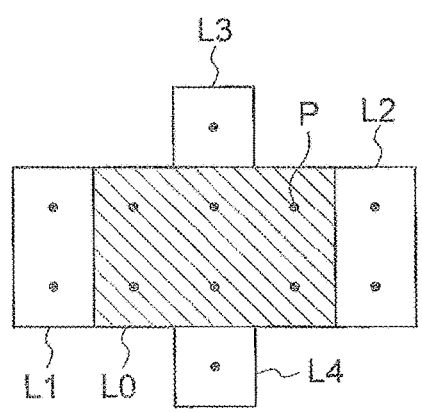
(d)

*Fig.32*
(a)
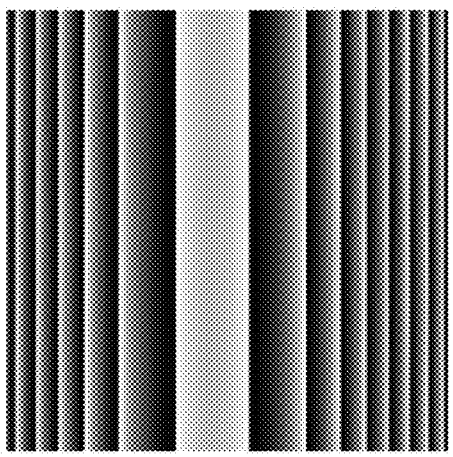
(b)
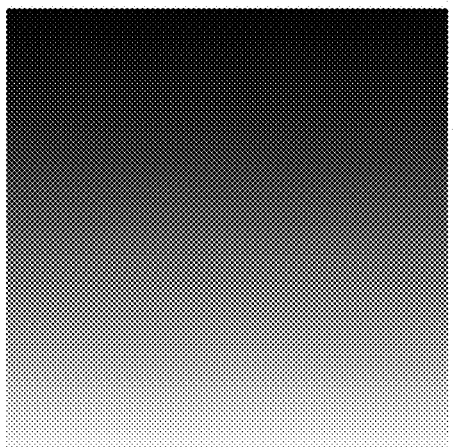
(c)
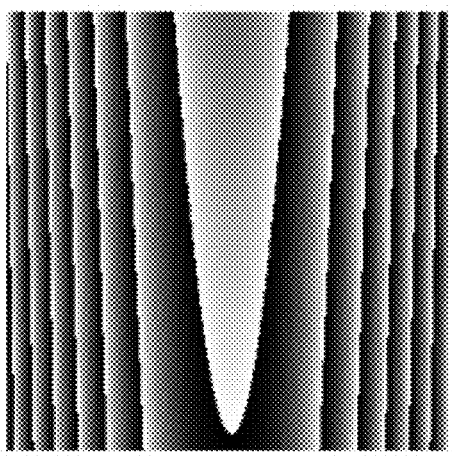

ADJUSTMENT METHOD FOR ADAPTIVE OPTICS SYSTEM, ADAPTIVE OPTICS SYSTEM, AND STORAGE MEDIUM STORING PROGRAM FOR ADAPTIVE OPTICS SYSTEM

TECHNICAL FIELD

An aspect of the present invention relates to an adjustment method for an adaptive optics system, an adaptive optics system, and a storage medium storing a program for an adaptive optics system.

BACKGROUND ART

In Non Patent Literatures 1 and 2, methods of adjusting an adaptive optics system according to a phase measuring method are disclosed. The phase measuring method is a method of measuring a phase distribution through a wavefront sensor after causing a spatial light modulator to display a known phase distribution and mutually associating coordinates on a modulation surface and coordinates on a detection surface by comparing a measurement result with the known phase distribution.

CITATION LIST

Non Patent Literature

[Non Patent Literature 1] Abdul Awwal, et al., "Characterization and Operation of a Liquid Crystal Adaptive Optics Phoropter," Proceedings of SPIE, Volume 5169, pp. 104-122 (2003)

[Non Patent Literature 2] Jason Porter, Hope Queener, Julianna Lin, Karen Thorn, and Abdul Awwal, "Adaptive Optics for Vision Science," Wiley Interscience, Chapter 18, pp. 496-499 (2006)

SUMMARY OF INVENTION

Technical Problem

Adaptive optics technology is technology for dynamically removing an aberration by measuring an optical aberration (wavefront distortion) using a wavefront sensor and controlling a wavefront modulation element (spatial light modulator) based on a measurement result. It is possible to improve an imaging characteristic, a degree of convergence, an SN ratio of an image, and measurement precision through the above-described adaptive optics technology. Conventionally, adaptive optics technology was mainly used in astronomical telescopes and large laser apparatuses. In recent years, adaptive optics technology has been applied to ocular fundus cameras, scanning laser ophthalmoscopes, optical coherence tomography apparatuses, laser microscopes, etc. Imaging using such adaptive optics technology enables observation at high resolution that was previously unavailable. For example, the ocular aberration is removed by applying the adaptive optics technology to an ocular fundus imaging apparatus for observing the back (ocular fundus) of the eye. For example, it is possible to clearly draw a microstructure of the ocular fundus such as a visual cell, a nerve fiber, or a capillary. The adaptive optics technology can be applied to the early diagnosis of diseases concerning the circulatory system as well as ocular diseases.

An adaptive optics system for implementing the above-described adaptive optics technology is mainly constituted of a spatial light modulator, a wavefront sensor, and a control apparatus for controlling the spatial light modulator and the wavefront sensor. Adjustment (calibration) of the adaptive optics system is necessary to completely eliminate wavefront distortion by correctly operating the adaptive optics system. In the calibration of the adaptive optics system, a correspondence relation is mainly adjusted between a control signal for the spatial light modulator and a measurement signal by the wavefront sensor.

This correspondence relation is roughly divided into two types.

(1) Correspondence relation between a magnitude of the control signal for the spatial light modulator and a magnitude of the measurement signal by the wavefront sensor (2) Correspondence relation between a position of a control point in the spatial light modulator and a position of a measurement point in the wavefront sensor The above-described correspondence relation (1) can be easily acquired from a phase modulation characteristic of the spatial light modulator. Also, the phase modulation characteristic of the spatial light modulator may depend upon an environment (for example, a temperature or a time-dependent change) using the spatial light modulator, but is a negligible level in many cases. In addition, the above-described correspondence relation (2) depends upon a spatial positional relation (mainly a positional relation within a plane intersecting the optical axis) between the spatial light modulator and the wavefront sensor.

In the adaptive optics system, a wavefront is controlled with a precision of a light wavelength or less (for example, a sub-micro level). Therefore, positional displacement may occur between a phase distribution measured in the wavefront sensor and a compensation phase pattern displayed in the spatial light modulator due to vibration at the time of transportation or in an installation place or deformation or the like of a member for holding the wavefront sensor or the spatial light modulator by heat. Accordingly, an adjustment operation related to the above-described (2) is not limited to the time of assembly or maintenance of an apparatus including the adaptive optics system, and it is preferable to perform the adjustment operation even immediately before the apparatus is used or during a plurality of times of imaging. Thus, means for executing the above-described adjustment operation easily and with high precision is required.

However, because it is necessary to calculate a phase distribution from a measurement result of the wavefront sensor in the phase measurement method disclosed in Non Patent Literature 1, the precision of the adjustment depends upon phase modulation precision of the spatial light modulator, phase measurement precision of the wavefront sensor, and precision of an optical image for calibration, and it is difficult to stably implement the adjustment with high precision.

An aspect of the present invention has been made in view of the above-described problems, and an objective of the invention is to provide an adjustment method for an adaptive optics system, an adaptive optics system, and a storage medium storing a program for an adaptive optics system that can adjust a correspondence relation between a phase pattern measured in a wavefront sensor and a compensation phase pattern displayed in a spatial light modulator quickly and with high precision.

Solution to Problem

According to an aspect of the present invention for solving the above-described problems, there is provided an adjustment method for an adaptive optics system, which includes a spatial light modulator configured to spatially modulate a phase of an optical image incident on a modulation surface and a wavefront sensor including a lens array having a plurality of two-dimensionally arranged lenses and an optical detection element for detecting a light intensity distribution including converging spots formed by the lens array and configured to receive the optical image after the modulation from the spatial light modulator and which compensates for wavefront distortion by controlling a phase pattern displayed in the spatial light modulator based on a wavefront shape of the optical image obtained from the light intensity distribution, wherein the correspondence relation between the modulation surface and the wavefront sensor is adjusted, the adjustment method including: a first light intensity distribution acquiring step of acquiring the light intensity distribution through the optical detection element in a state in which one of a first phase pattern having linearity in at least one direction and a spatially non-linear second phase pattern is displayed in a first region on the modulation surface for corresponding to one of the plurality of lenses or two or more lenses adjacent to each other and the other of the first and second phase patterns is displayed in a second region surrounding the first region; and an adjusting step of adjusting the correspondence relation between the modulation surface and the wavefront sensor based on clarity of the converging spot included in the light intensity distribution obtained in the first light intensity distribution acquiring step.

Also, the adjustment method for the adaptive optics system may further include: a second light intensity distribution acquiring step of acquiring the light intensity distribution through the optical detection element in a state in which a spatially non-linear phase pattern is displayed in the first and second regions; and a difference calculating step of calculating a difference between a numeric value related to clarity of the converging spot included in the light intensity distribution obtained in the first light intensity distribution acquiring step and a numeric value related to clarity of the converging spot included in the light intensity distribution obtained in the second light intensity distribution acquiring step, wherein the correspondence relation between the modulation surface and the wavefront sensor is adjusted based on the difference obtained in the difference calculating step instead of the clarity of the converging spot included in the light intensity distribution obtained in the first light intensity distribution acquiring step at the time of the adjusting step.

Also, in the adjustment method for the adaptive optics system, the adjustment of the correspondence relation between the modulation surface and the wavefront sensor in the adjusting step may be adjustment of a relative positional relation between position coordinates assumed on the modulation surface when the phase pattern for wavefront distortion compensation is displayed and the wavefront sensor. Alternatively, in the adjustment method for the adaptive optics system, the adjustment of the correspondence relation between the modulation surface and the wavefront sensor in the adjusting step may be adjustment of a relative relation between a mounting position of the wavefront sensor and a mounting position of the spatial light modulator.

Also, in the adjustment method for the adaptive optics system, a width of the first region in an array direction of the plurality of lenses may be $(n_1/M)$ times an array pitch of the plurality of lenses (here, $n_1$ is a natural number and M is an imaging magnification of an optical system between the modulation surface and the lens array).

Also in the adjustment method for the adaptive optics system, the spatially non-linear phase pattern (that is, a phase pattern having a spatially non-linear phase profile) may include at least one of a random distribution in which a distribution of magnitudes of phases is irregular and a defocus distribution which increases a diameter of the converging spot.

In addition, in the adjustment method for the adaptive optics system, the phase pattern having the linearity in the at least one direction (that is, a phase pattern in which a phase profile of at least one direction has the linearity) includes at least one of a substantially uniform phase distribution, a phase distribution inclined in at least one direction, a phase distribution which has a cylindrical lens effect in a first direction and is substantially uniform in a second direction intersecting (for example, orthogonal to) the first direction, and a phase distribution which constitutes a diffraction grating in a first direction and is substantially uniform in a second direction intersecting (for example, orthogonal to) the first direction.

Also, according to an aspect of the present invention, there is provided an adaptive optics system including: a spatial light modulator configured to spatially modulate a phase of an optical image incident on a modulation surface; a wavefront sensor including a lens array having a plurality of two-dimensionally arranged lenses and an optical detection element for detecting a light intensity distribution including converging spots formed by the lens array and configured to receive the optical image after the modulation from the spatial light modulator; and a control unit configured to compensate for wavefront distortion by controlling a phase pattern displayed in the spatial light modulator based on a wavefront shape of the optical image obtained from the light intensity distribution, wherein the control unit acquires the light intensity distribution through the optical detection element in a state in which one of a first phase pattern having linearity in at least one direction and a spatially non-linear second phase pattern is displayed in a first region on the modulation surface for corresponding to one of the plurality of lenses or two or more lenses adjacent to each other and the other of the first and second phase patterns is displayed in a second region surrounding the first region and adjusts a correspondence relation between the modulation surface and the wavefront sensor based on clarity of the converging spot included in the light intensity distribution.

Also, there is provided a program for an adaptive optics system, which includes a spatial light modulator configured to spatially modulate a phase of an optical image incident on a modulation surface, a wavefront sensor including a lens array having a plurality of two-dimensionally arranged lenses and an optical detection element for detecting a light intensity distribution including converging spots formed by the lens array and configured to receive the optical image after the modulation from the spatial light modulator, and a control unit configured to compensate for wavefront distortion by controlling a phase pattern displayed in the spatial light modulator based on a wavefront shape of the optical image obtained from the light intensity distribution, wherein the program controls an operation of the control unit in the adaptive optics system, the program causing the control unit to execute: a first light intensity distribution acquiring step of acquiring the light intensity distribution through the optical detection element in a state in which one of a first phase pattern having linearity in at least one direction and a spatially non-linear second phase pattern is displayed in a first region on the modulation surface for corresponding to one of the plurality of lenses or two or more lenses adjacent to each other and the other of the first and second phase patterns is displayed in a second region surrounding the first region; and an adjusting step of adjusting a correspondence relation between the modulation surface and the wavefront sensor based on clarity of the converging spot included in the light intensity distribution obtained in the first light intensity distribution acquiring step.

Also, according to an aspect of the present invention, there is provided a storage medium storing a program for an adaptive optics system, which includes a spatial light modulator configured to spatially modulate a phase of an optical image incident on a modulation surface, a wavefront sensor including a lens array having a plurality of two-dimensionally arranged lenses and an optical detection element for detecting a light intensity distribution including converging spots formed by the lens array and configured to receive the optical image after the modulation from the spatial light modulator, and a control unit configured to compensate for wavefront distortion by controlling a phase pattern displayed in the spatial light modulator based on a wavefront shape of the optical image obtained from the light intensity distribution, wherein the program for the adaptive optics system controls an operation of the control unit, the program for an adaptive optics system causing the control unit to execute: a first light intensity distribution acquiring step of acquiring the light intensity distribution through the optical detection element in a state in which one of a first phase pattern having linearity in at least one direction and a spatially non-linear second phase pattern is displayed in a first region on the modulation surface for corresponding to one of the plurality of lenses or two or more lenses adjacent to each other and the other of the first and second phase patterns is displayed in a second region surrounding the first region; and an adjusting step of adjusting a correspondence relation between the modulation surface and the wavefront sensor based on clarity of the converging spot included in the light intensity distribution obtained in the first light intensity distribution acquiring step.

Advantageous Effects of Invention

According to an adjustment method for an adaptive optics system, an adaptive optics system, and a storage medium storing a program for an adaptive optics system according to an aspect of the present invention, it is possible to adjust a correspondence relation between a phase pattern measured in a wavefront sensor and a compensation phase pattern displayed in a spatial light modulator quickly and with high precision.

BRIEF DESCRIPTION OF DRAWINGS

FIG. 9 is a diagram conceptually illustrating light intensity distribution data (Shack-Hartmann-Gram) detected by the image sensor of the wavefront sensor.

FIG. 25 is a diagram illustrating a merit according to an increase of precision of adjustment (calibration) of the adaptive optics system.

FIG. 27 is a diagram illustrating examples of various sizes of the first region.

FIG. 32 is a diagram illustrating an example of a composite pattern obtained by superimposition.

DESCRIPTION OF EMBODIMENTS

Hereinafter, embodiments of an adjustment method for an adaptive optics system, an adaptive optics system, a program for an adaptive optics system, and a storage medium storing a program for an adaptive optics system according to an aspect of the present invention will be described with reference to the accompanying drawings. Also, the same elements are assigned the same reference signs in the description of the drawings and redundant description thereof will be omitted. Also, in the following description, it is assumed that a "phase distribution" indicates two-dimensionally distributed phase values, a "phase pattern" indicates a pattern obtained by coding the phase distribution (two-dimensional phase values) based on a certain standard, and a "phase profile" indicates a distribution of phase values in a certain direction (line) in the phase distribution.

EMBODIMENTS

Figure 1:
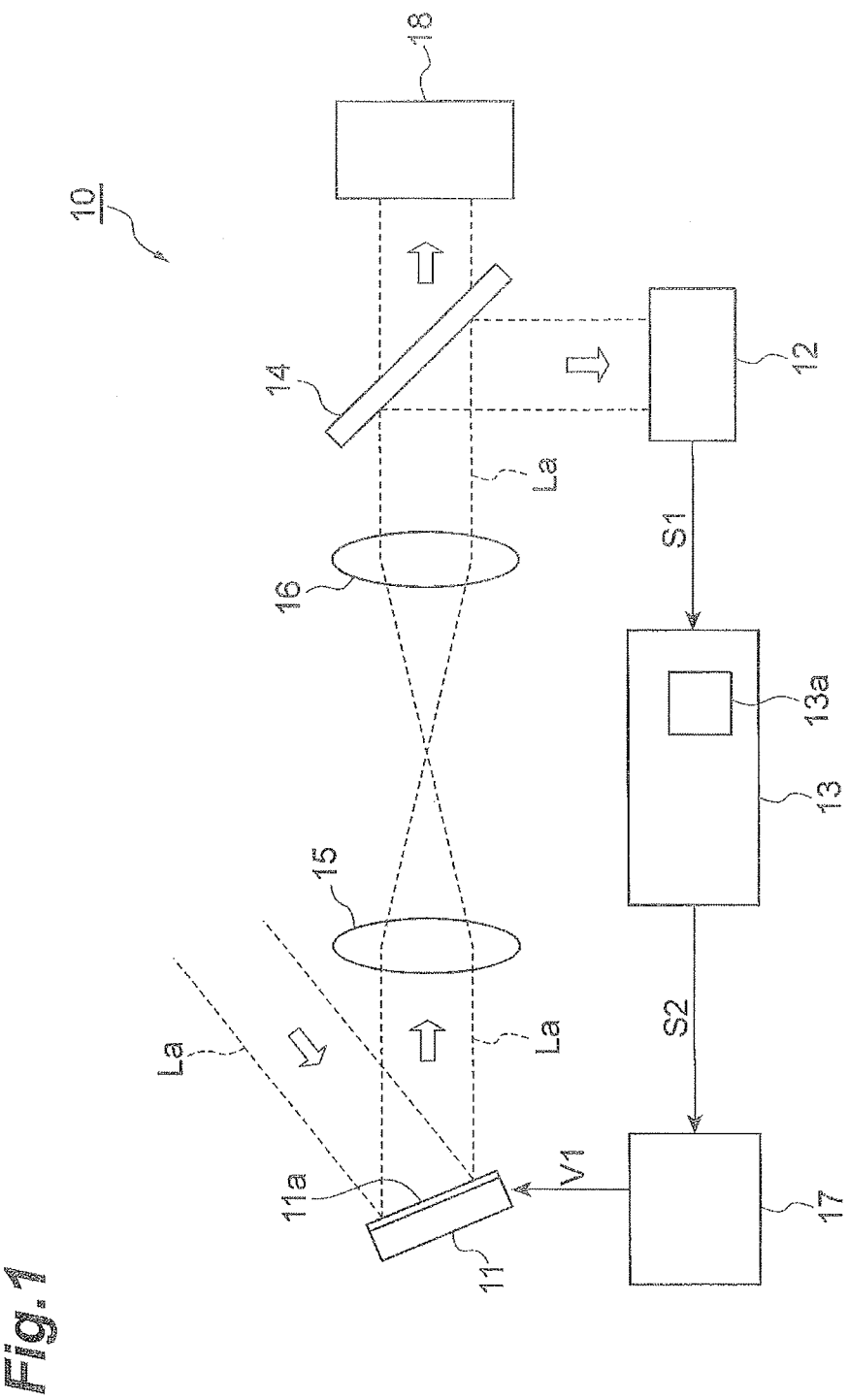
FIG. 1 is a diagram schematically illustrating a configuration of an adaptive optics system according to an embodiment.

FIG. 1 is a diagram schematically illustrating a configuration of an adaptive optics system 10 according to this embodiment. The adaptive optics system 10, for example, is embedded in an ophthalmologic inspection apparatus, a laser processing apparatus, a microscope apparatus, an adaptive optics apparatus, or the like. This adaptive optics system 10 includes a spatial light modulator (SLM) 11, a wavefront sensor 12, a control unit 13, a beam splitter 14, relay lenses 15 and 16, and a control circuit unit 17.

The spatial light modulator 11 receives an optical image La by a modulation surface 11a which displays a phase pattern and modulates a wavefront shape of the optical image La to output the modulated wavefront shape. The optical image La incident on the spatial light modulator 11, for example, is light emitted from a laser light source or a super luminescent diode (SLD) or reflected light, scattered light, fluorescent light, or the like generated from an observation object irradiated with light. The wavefront sensor 12 provides the control unit 13 with data S1 including information about the wavefront shape of the optical image La reaching from the spatial light modulator 11 (typically indicating distortion of a wavefront, that is, displacement of a wavefront from a reference wavefront, shown due to an aberration of an optical system). The control unit 13 generates a control signal S2 for displaying a phase pattern suitable for the spatial light modulator 11 based on the data S1 obtained from the wavefront sensor 12. In an example, the control unit 13 includes an input unit configured to input the data S1 from the wavefront sensor 12, an aberration calculation unit configured to calculate an aberration from the data S1, a phase pattern calculation unit configured to calculate a phase pattern to be displayed in the spatial light modulator 11, and a signal generation unit configured to generate the control signal S2 according to the calculated phase pattern. The control circuit unit 17 receives the control signal S2 from the control unit 13 and applies a voltage V1 based on the control signal S2 to a plurality of electrodes of the spatial light modulator 11.

The beam splitter 14 is arranged between the wavefront sensor 12 and the spatial light modulator 11 and branches the optical image La. The beam splitter 14 may be a beam splitter of a polarization direction independent type, a polarization direction dependent type, or a wavelength dependent type (dichroic mirror). One optical image La branched by the beam splitter 14, for example, is sent to an optical detection element 18 such as a CCD, a photomultiplier tube, or an avalanche photodiode. The optical detection element 18, for example, is embedded in a scanning laser ophthalmoscope (SLO), an optical coherence tomography (OCT) camera, an ocular fundus camera, a microscope, a telescope, or the like. In addition, the other optical image La branched by the beam splitter 14 is incident on the wavefront sensor 12.

The relay lenses 15 and 16 are arranged side by side in an optical axis direction between the wavefront sensor 12 and the spatial light modulator 11. The wavefront sensor 12 and the spatial light modulator 11 are maintained in a mutually optical conjugate relation by the relay lenses 15 and 16. Also, an optical imaging lens and/or a polarization mirror, etc. may be further arranged between the wavefront sensor 12 and the spatial light modulator 11.

Figure 2:
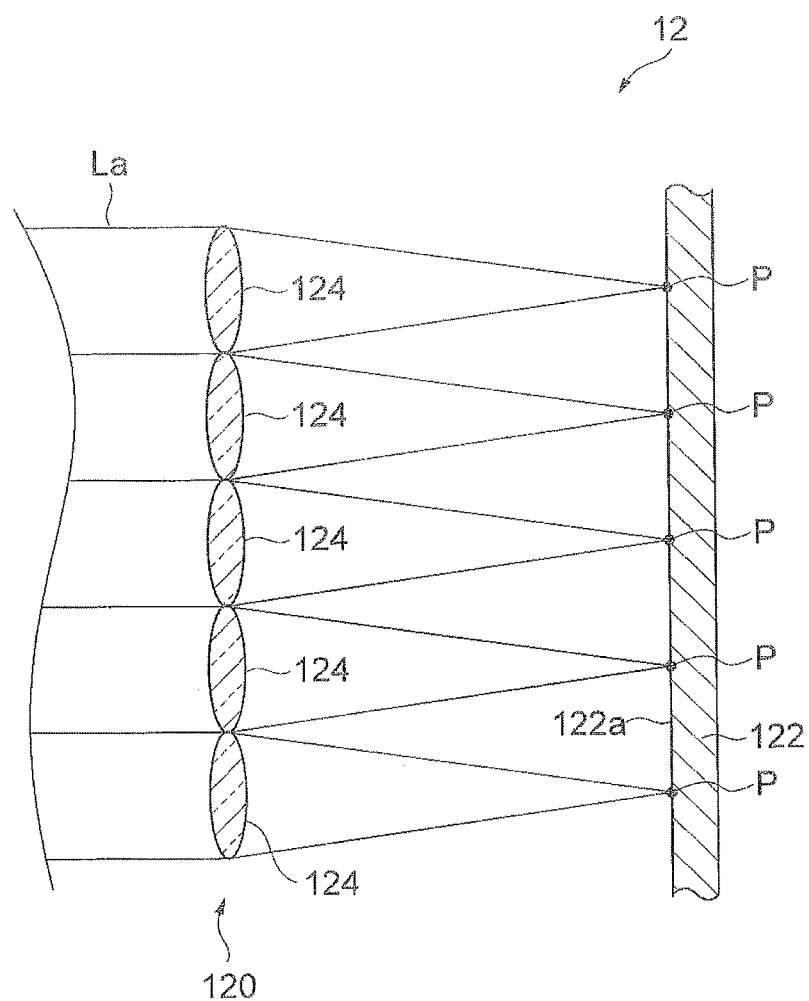
FIG. 2 is a cross-sectional view schematically illustrating a configuration of a wavefront sensor of an embodiment and illustrates a cross section along an optical axis of an optical image.
Figure 3:
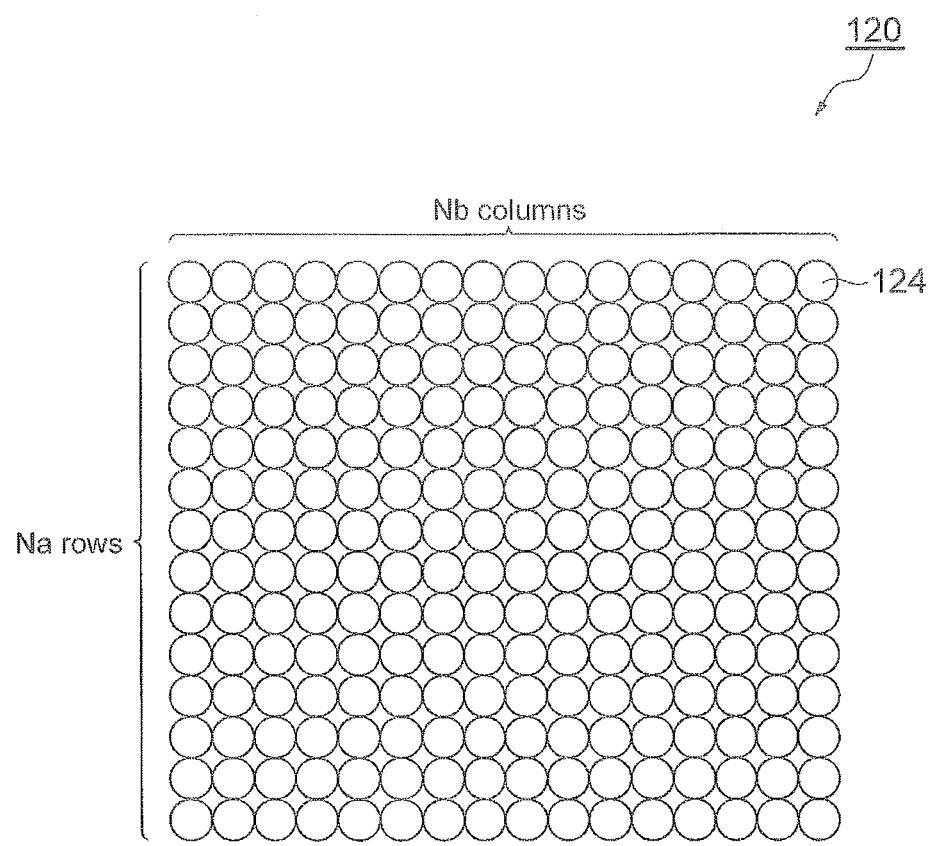
FIG. 3 is a view of a lens array provided in the wavefront sensor viewed in an optical axis direction of an optical image.
Figure 4:
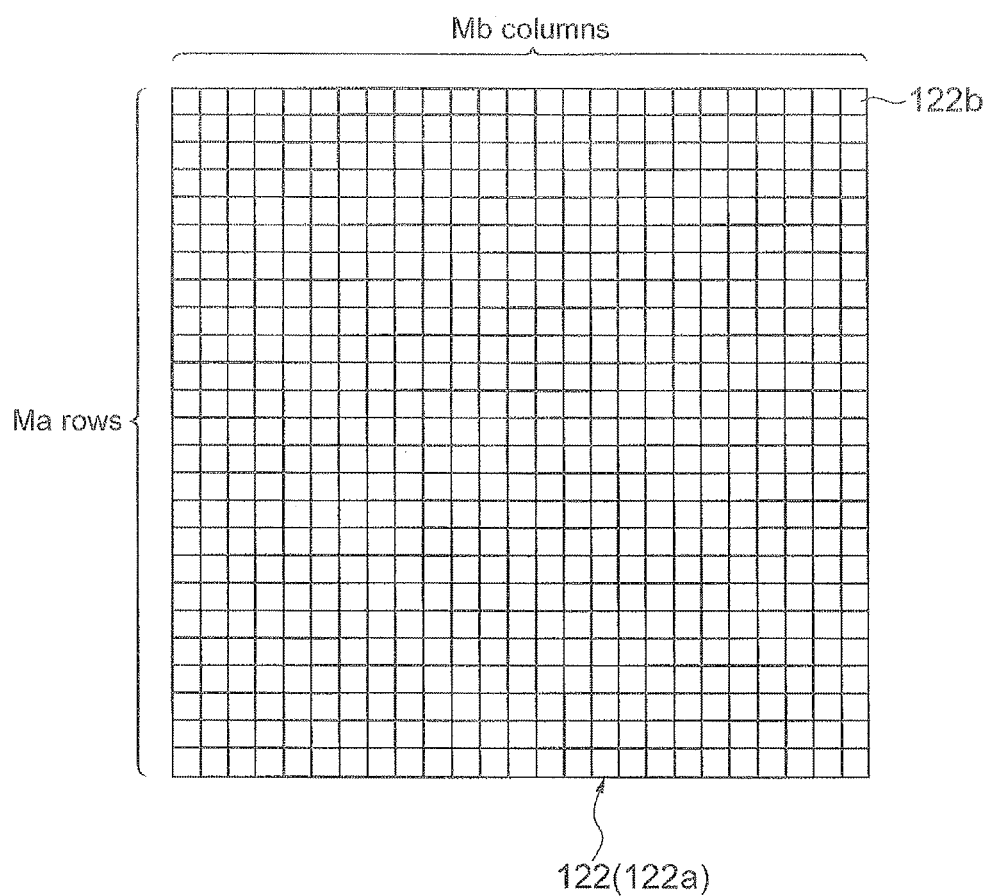
FIG. 4 is a view of an image sensor provided in the wavefront sensor viewed in the optical axis direction of the optical image.

FIG. 2 is a cross-sectional view schematically illustrating a configuration of the wavefront sensor 12 of this embodiment and illustrates a cross section along the optical axis of the optical image La. FIG. 3 is a view of a lens array 120 provided in the wavefront sensor 12 viewed in the optical axis direction of the optical image La. FIG. 4 is a view of an image sensor (optical detection element) 122 provided in the wavefront sensor 12 viewed in the optical axis direction of the optical image La.

Although the wavefront sensor 12 may be of an interference type or a non-interference type, the non-interference type Shack-Hartmann wavefront sensor having the lens array 120 and the image sensor 122 is used as the wavefront sensor 12 in this embodiment. When the non-interference type wavefront sensor is used, there is an advantage in that vibration insensitivity is excellent and a configuration of the wavefront sensor and a process of calculating measurement data can be simpler than when the interference type wavefront sensor is used.

As illustrated in FIG. 3, the lens array 120 has N (N is an integer greater than or equal to 4) lenses 124. The N lenses 124, for example, are arranged in a two-dimensional lattice shape of Na rows and Nb columns (Na and Nb are integers greater than or equal to 2).

Also, the image sensor 122 illustrated in FIG. 2 has a light receiving surface 122a at a position overlapping a back focal plane of the N lenses 124 constituting the lens array 120 and detects a light intensity distribution including N converging spots P formed by the N lenses 124. As illustrated in FIG. 4, the image sensor 122 is configured to include a plurality of pixels 122b arranged in a two-dimensional lattice shape of Ma rows and Mb columns (Ma and Mb are integers greater than or equal to 2). Also, the row direction and the column direction of the image sensor 122 match those of the lens array 120. An array pitch of the pixels 122b of the image sensor 122 is configured to be sufficiently less than an array pitch of the lenses 124 so that a magnitude of displacement of a converging image position from the reference position can be detected with high precision.

In the control unit 13 to be described below, a wavefront shape (a distribution of phase gradients) of the optical image La is measured based on a light intensity distribution detected by the image sensor 122. That is, a magnitude of displacement between the position of the converging spot P by the lens 124 and the reference position is proportional to a slope of a local wavefront of the optical image La incident on the lens 124. Accordingly, it is possible to calculate the magnitude of the positional displacement of the converging spot P from the reference position for each lens 124 and measure a wavefront shape of the optical image La based on the positional displacement of the converging spot P.

It is possible to designate a position at which an optical axis of each of the plurality of lenses 124 intersects the light receiving surface 122a of the image sensor 122 as the reference position to be used to calculate the magnitude of the displacement of the converging image position. This position is easily obtained through center-of-gravity calculation using a converging image obtained by causing parallel plane waves to be perpendicularly incident on each lens 124.

The spatial light modulator 11 is an element which receives the optical image La from a light source or an observation object and modulates a wavefront of the optical image La to output the modulated wavefront. Specifically, the spatial light modulator 11 has a plurality of pixels (control points) arranged in a two-dimensional lattice shape and changes a modulation amount (for example, a phase modulation amount) of each pixel according to the control signal S2 provided from the control unit 13. The spatial light modulator 11, for example, includes a liquid crystal on silicon spatial light modulator (LCOS-SLM), a programmable phase modulator (PPM), a liquid crystal display (LCD), micro electro mechanical systems (MEMS), or an electrical address type spatial light modulator formed by coupling an LCD element and an optical address type liquid-crystal spatial light modulator. Also, although the reflection type spatial light modulator 11 is illustrated in FIG. 1, the spatial light modulator 11 may be of a transmission type.

Figure 5:
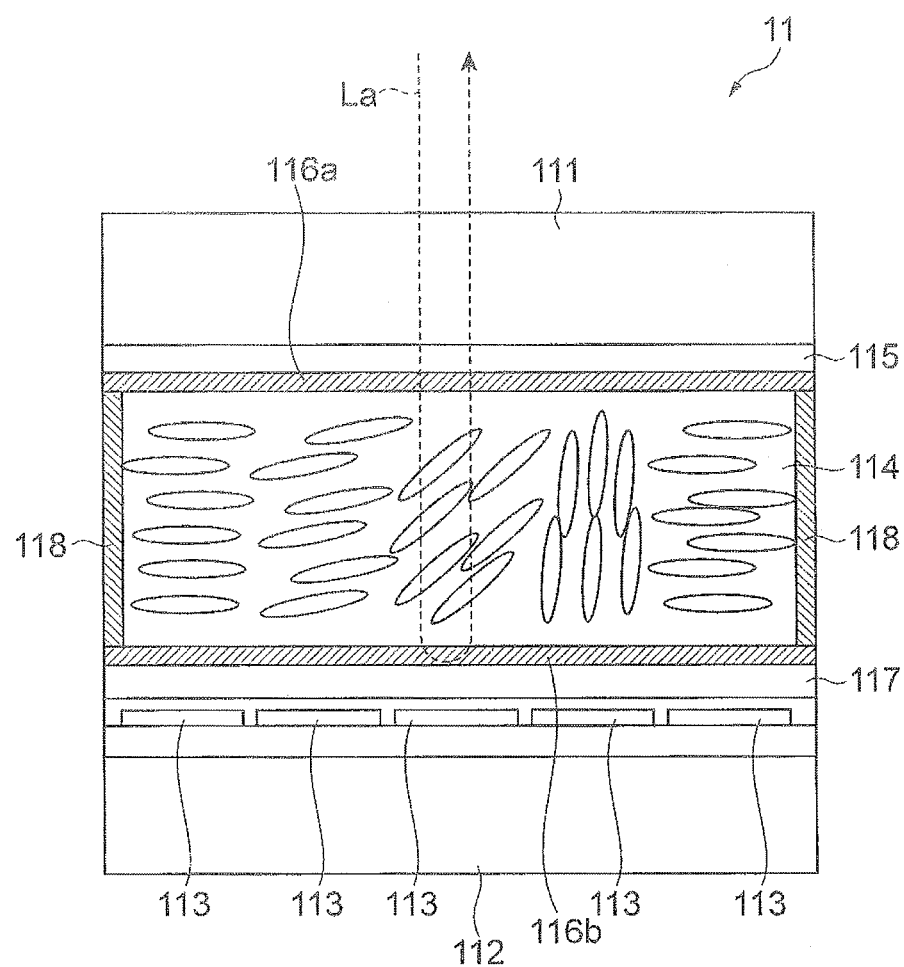
FIG. 5 is a cross-sectional view schematically illustrating an LCOS type spatial light modulator as an example of a spatial light modulator of an embodiment and illustrates a cross section along the optical axis of the optical image.

FIG. 5 is a cross-sectional view schematically illustrating an LCOS type spatial light modulator as an example of the spatial light modulator 11 of this embodiment and illustrates a cross section along the optical axis of the optical image La. This spatial light modulator 11 includes a transparent substrate 111, a silicon substrate 112, a plurality of pixel electrodes 113, a liquid crystal unit (modulation unit) 114, a transparent electrode 115, oriented films 116a and 116b, a dielectric mirror 117, and a spacer 118.

The transparent substrate 111 is formed of a material which transmits the optical image La and arranged along a main surface of the silicon substrate 112. The plurality of pixel electrodes 113 are arranged in a two-dimensional lattice shape on the main surface of the silicon substrate 112 and constitute pixels of the spatial light modulator 11. The transparent electrode 115 is arranged on the surface of the transparent substrate 111 opposite to the plurality of pixel electrodes 113. The liquid crystal unit 114 is arranged between the plurality of pixel electrodes 113 and the transparent electrode 115. The oriented film 116a is arranged between the liquid crystal unit 114 and the transparent electrode 115 and the oriented film 116b is arranged between the liquid crystal unit 114 and the plurality of pixel electrodes 113. The dielectric mirror 117 is arranged between the oriented film 116b and the plurality of pixel electrodes 113. The dielectric mirror 117 reflects the optical image La incident from the transparent substrate 111 and transmitted through the liquid crystal unit 114 and causes the optical image La to be re-emitted from the transparent substrate 111.

Also, the spatial light modulator 11 further includes a pixel electrode circuit (active matrix drive circuit) 119 configured to control a voltage to be applied between the plurality of pixel electrodes 113 and the transparent electrode 115. When the voltage is applied from the pixel electrode circuit 119 to any pixel electrode 113, a refractive index of the liquid crystal unit 114 on the pixel electrode 113 changes according to a magnitude of an electric field generated between the pixel electrode 113 and the transparent electrode 115. Accordingly, an optical path length of the optical image La transmitted through a relevant part of the liquid crystal unit 114 changes and consequently a phase of the optical image La changes. By applying voltages of various magnitudes to the plurality of pixel electrodes 113, it is possible to electrically write a spatial distribution of a phase adjustment amount and implement various wavefront shapes if necessary.

Figure 6:
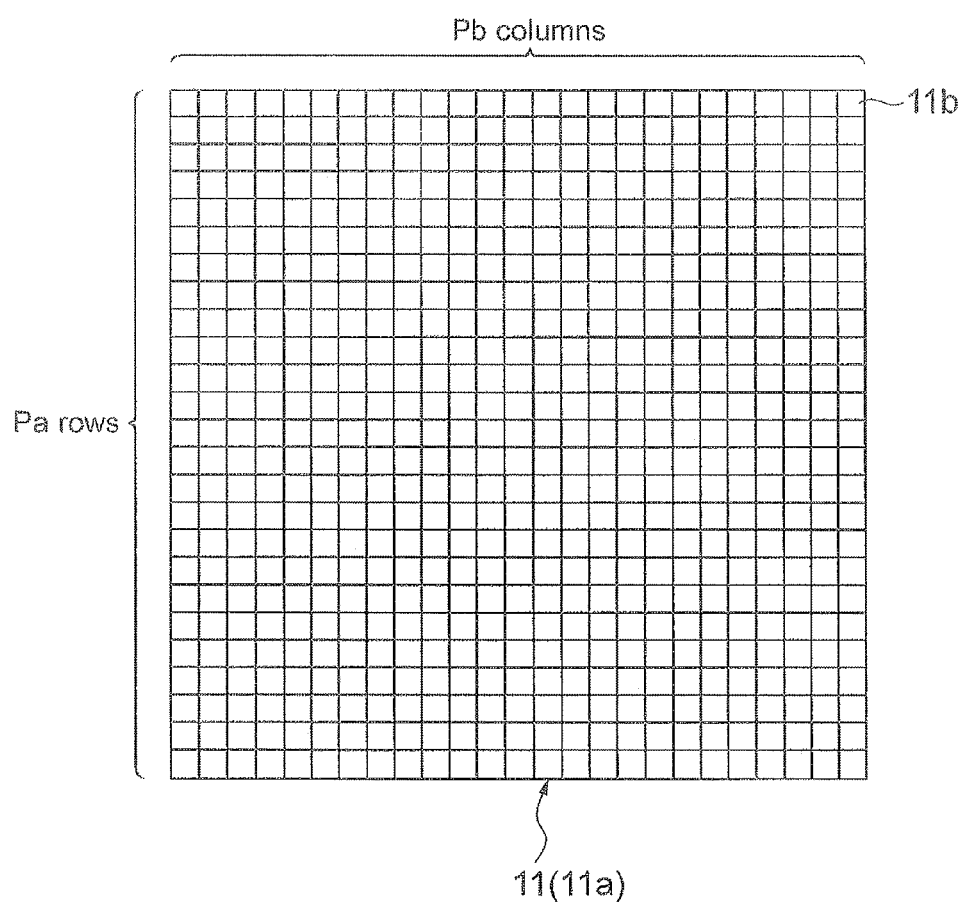
FIG. 6 is a front view of a modulation surface of the spatial light modulator.

FIG. 6 is a front view of a modulation surface 11a of the spatial light modulator 11. As illustrated in FIG. 6, the modulation surface 11a is configured to include a plurality of pixels 11b arranged in a two-dimensional lattice shape of Pa rows and Pb columns (Pa and Pb are integers greater than or equal to 2). Also, each of the plurality of pixels 11b is constituted of one of the plurality of pixel electrodes 113.

Description will now return to FIG. 1. In this adaptive optics system 10, the optical image La from a light source or an observation object (not illustrated) is first incident on the spatial light modulator 11 as substantially parallel light. The optical image La modulated by the spatial light modulator 11 is incident on the beam splitter 14 via the relay lenses 15 and 16 and is branched into two optical images. One optical image La after the branching is incident on the wavefront sensor 12. The data S1 including the wavefront shape (phase distribution) of the optical image La is generated in the wavefront sensor 12 and the data S1 is provided to the control unit 13. The control unit 13 calculates the wavefront shape (phase distribution) of the optical image La if necessary based on the data S1 from the wavefront sensor 12 and outputs the control signal S2 including the phase pattern for appropriately compensating for wavefront distortion of the optical image La to the spatial light modulator 11. Thereafter, the non-distortion optical image La compensated for by the spatial light modulator 11 is branched by the beam splitter 14 and is incident on the optical detection element 18 via an optical system (not illustrated) and captured.

Here, a coordinate system in the modulation surface 11a of the spatial light modulator 11 and the detection surface of the wavefront sensor 12 is set as follows. That is, two directions parallel to the modulation surface 11a of the spatial light modulator 11 and orthogonal to each other are designated as an x-axis direction and a y-axis direction in the modulation surface 11a and two directions parallel to the detection surface of the wavefront sensor 12 and orthogonal to each other are designated as an x-axis direction and a y-axis direction in the detection surface. However, the x axis in the modulation surface 11a of the spatial light modulator 11 and the x axis in the detection surface of the wavefront sensor 12 are directed to be opposite to each other and the y axis in the modulation surface 11a of the spatial light modulator 11 and the y axis in the detection surface of the wavefront sensor 12 are directed to be opposite to each other. Also, coordinates at which the center of the modulation surface 11a of the spatial light modulator 11 is designated as the origin are set as (Xs, Ys) and coordinates at which the center of the detection surface of the wavefront sensor 12 is designated as the origin are set as (Xc, Yc).

At this time, the phase of the wavefront at a position (Xs, Ys) on the modulation surface 11a of the spatial light modulator 11 is mapped one-to-one to the phase of the wavefront at a position (Xc, Yc) on the detection surface of the wavefront sensor 12 and a relation between them is expressed by the following Formulas (1) when there is no rotational displacement between the modulation surface 11a and the detection surface.

[Math 1]

$$Xs = \frac{Xc}{M} \div Xs_0 \qquad (1)$$
$$Ys = \frac{Yc}{M} + Ys_0$$

Here, M denotes magnifications of the lenses 15 and 16. In addition, $(Xs_0, Ys_0)$ denotes coordinates on the modulation surface 11a of the spatial light modulator 11 projected onto a coordinate origin on the detection surface of the wavefront sensor 12 and denotes an amount of positional displacement between the modulation surface 11a and the detection surface. Also, the magnification M included in Formulas (1) is known in many cases.

The adjustment (calibration) of a correspondence relation between the modulation surface 11a and the wavefront sensor 12 of the adaptive optics system 10 in this embodiment is an operation of investigating a value of the above-described $(Xs_0, Ys_0)$ and making the value close to zero. In other words, this is the adjustment of a relative relation between a mounting position of the wavefront sensor 12 and a mounting position of the spatial light modulator 11. Alternatively, the value of the above-described $(Xs_0, Ys_0)$ is considered in the adjustment (calibration) of a correspondence relation between the modulation surface 11a and the wavefront sensor 12 when a phase pattern assigned to the spatial light modulator 11 is associated with a wavefront shape obtained from the wavefront sensor 12. In other words, this is the adjustment of a relative positional relation between the positional coordinates assumed on the modulation surface 11a when the phase pattern for compensating for wavefront distortion is displayed and the wavefront sensor 12.

In the adjustment method for the adaptive optics system according to this embodiment, a special phase pattern for the adjustment is displayed in the spatial light modulator 11 and a feature occurring due to the phase pattern in the wavefront sensor 12 is detected, so that an amount of positional displacement between the wavefront shape measured in the wavefront sensor 12 and the phase pattern displayed in the spatial light modulator 11 is acquired and the adjustment (calibration) of the correspondence relation between the modulation surface 11a and the wavefront sensor 12 is performed based on the amount of positional displacement.

Hereinafter, a method of the adjustment (calibration) of the correspondence relation between the modulation surface 11a and the wavefront sensor 12 will be described in detail. Also, this adjustment method is stored as a program inside a storage region 13a of the control unit 13 illustrated in FIG. 1 and the control unit 13 performs the adjustment method by reading the program.

Figure 7:
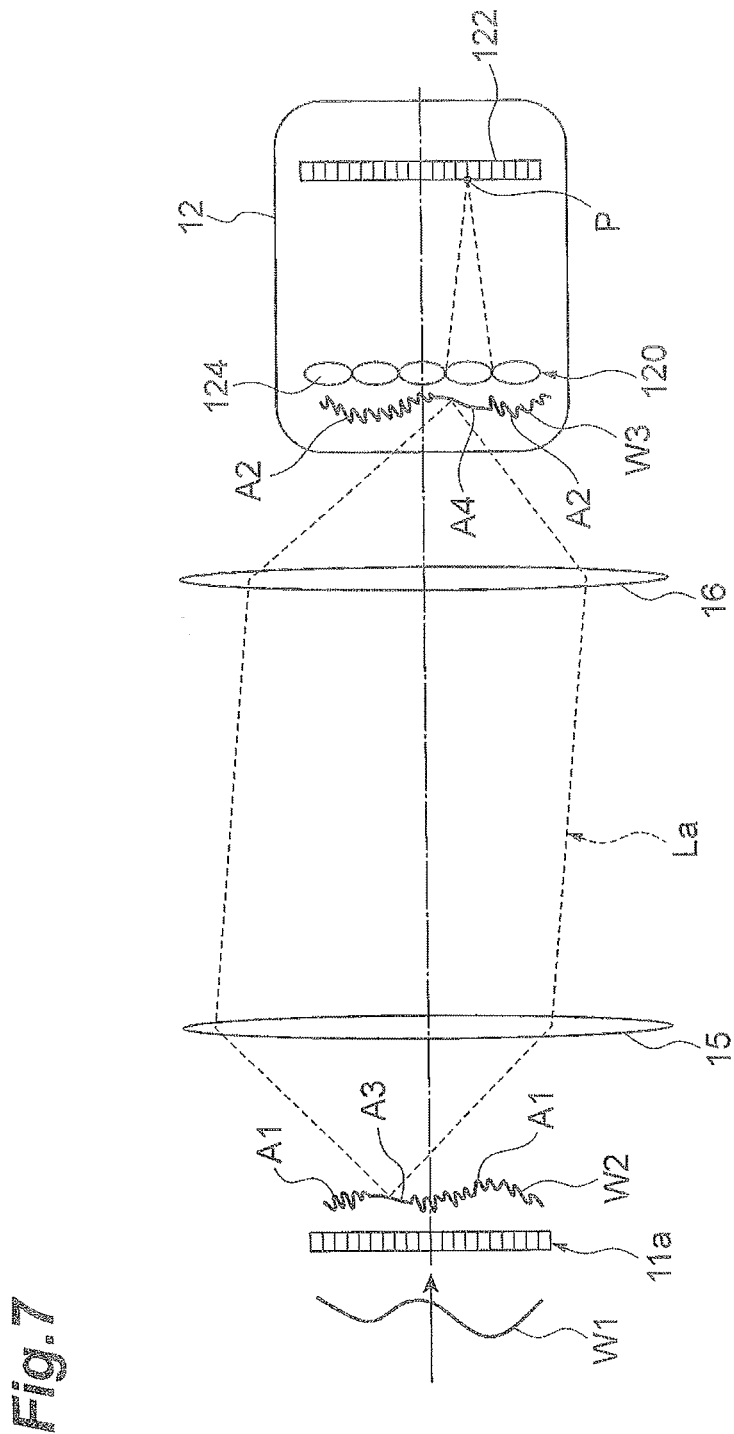
FIG. 7 is a conceptual view illustrating the principle of an adjustment method in an embodiment.

FIG. 7 is a conceptual view illustrating the principle of the adjusting method according to this embodiment. In FIG. 7, the relay lenses 15 and 16, a wavefront W1 of an optical image incident on the modulation surface 11a, a wavefront W2 of the optical image emitted from the modulation surface 11a, and a wavefront W3 of the optical image incident on the wavefront sensor 12 are illustrated in addition to the modulation surface 11a of the spatial light modulator 11 and the wavefront sensor 12 (the lens array 120 and the image sensor 122). The wavefront W2 obtained by applying a wavefront according to the phase pattern displayed in the spatial light modulator 11 to the incident wavefront W1 is emitted from the spatial light modulator 11. The wavefront W3 via a conjugate optical system including the relay lenses 15 and 16 is incident on the wavefront sensor 12. In addition, the optical image La emitted from the region on the modulation surface 11a corresponding to one lens 124 and reaching the lens 124 is illustrated in FIG. 7.

Figure 8:
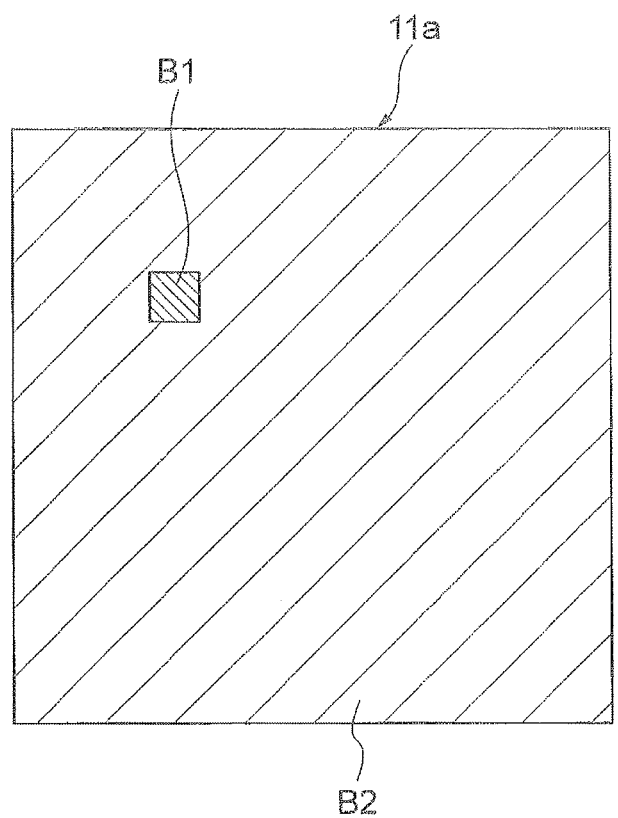
FIG. 8 is a diagram conceptually illustrating a special phase pattern displayed on the modulation surface.

Here, FIG. 8 is a diagram conceptually illustrating a special phase pattern displayed on the modulation surface 11a. Additionally, a first phase pattern having linearity in at least one direction is displayed in a region B1 (hereinafter referred to as a first region) on the modulation surface 11a having a magnitude corresponding to one lens 124. The first phase pattern, for example, is implemented to include a substantially uniform phase distribution, a phase distribution inclined in at least one direction, or the like. Alternatively, the first phase pattern is implemented to include a phase distribution having a cylindrical lens effect in a certain first direction and substantially uniform in the second direction intersecting (for example, orthogonal to) the first direction or a phase distribution constituting a diffraction grating in the first direction and substantially uniform in the second direction intersecting (for example, orthogonal to) the first direction. Also, the substantially uniform phase distribution may be a phase distribution having a linear function.

Also, simultaneously, a spatially non-linear second phase pattern (for example, a random distribution in which a distribution of magnitudes of phases is irregular, a defocus distribution which increases a diameter of a converging spot, or the like) is displayed in a region B2 (hereinafter referred to as a second region) surrounding the first region B1 on the modulation surface 11a. Then, a wavefront of a part corresponding to the second region B2 in the emission wavefront W2 is disturbed (part A1 of FIG. 7). The disturbance of the wavefront occurs even in a part incident on the lens 124 corresponding to the second region B2 in the incident wavefront W3 for the wavefront sensor 12 (part A2 of FIG. 7). Thereby, the converging spot P formed by the lens 124 diverges and the converging spot P is not formed, or its light intensity becomes weak.

On the other hand, the wavefront is incident on the lens 124 without being disturbed in at least one direction according to a first phase pattern having linearity in the at least one direction in parts (parts A3 and A4 of FIG. 7) corresponding to the first regions B1 in the wavefronts W2 and W3. Accordingly, the converging spot P is clearly formed by the lens 124.

FIG. 9 is a diagram conceptually illustrating light intensity distribution data (Shack-Hartmann-Gram) detected by the image sensor 122 of the wavefront sensor 12. FIG. 9(a) illustrates light intensity distribution data D1 of the case in which a phase pattern having linearity in at least one direction is displayed in the first region B1 and the spatially non-linear phase pattern is displayed in the second region B2. FIG. 9(b) illustrates light intensity distribution data D2 of the case in which a phase pattern having linearity in entire region is displayed for comparison.

When the phase pattern having the linearity in all the regions is displayed as illustrated in FIG. 9(b), N converging spots P corresponding to N lenses 124 are included in the light intensity distribution data. On the other hand, when the phase pattern having the linearity in the at least one direction is displayed in the first region B1 and the spatially non-linear phase pattern is displayed in the second region B2 as illustrated in FIG. 9(a), one converging spot P corresponding to the first region B1 is included in the light intensity distribution data, but the converging spot corresponding to the second region B2 is not formed, the maximum luminance of the spot is reduced, or the spot diameter is widened. That is, only the converging spot corresponding to the second region B2 with degraded clarity is formed.

Here, the example of the light intensity distribution illustrated in FIG. 9(a) is the case in which it is assumed that the adjustment (calibration) of positional displacement between the phase pattern displayed in the spatial light modulator 11 and the wavefront shape measured in the wavefront sensor 12 is appropriately performed. Hereinafter, the case in which these have positional displacement will be considered.

Figure 10:
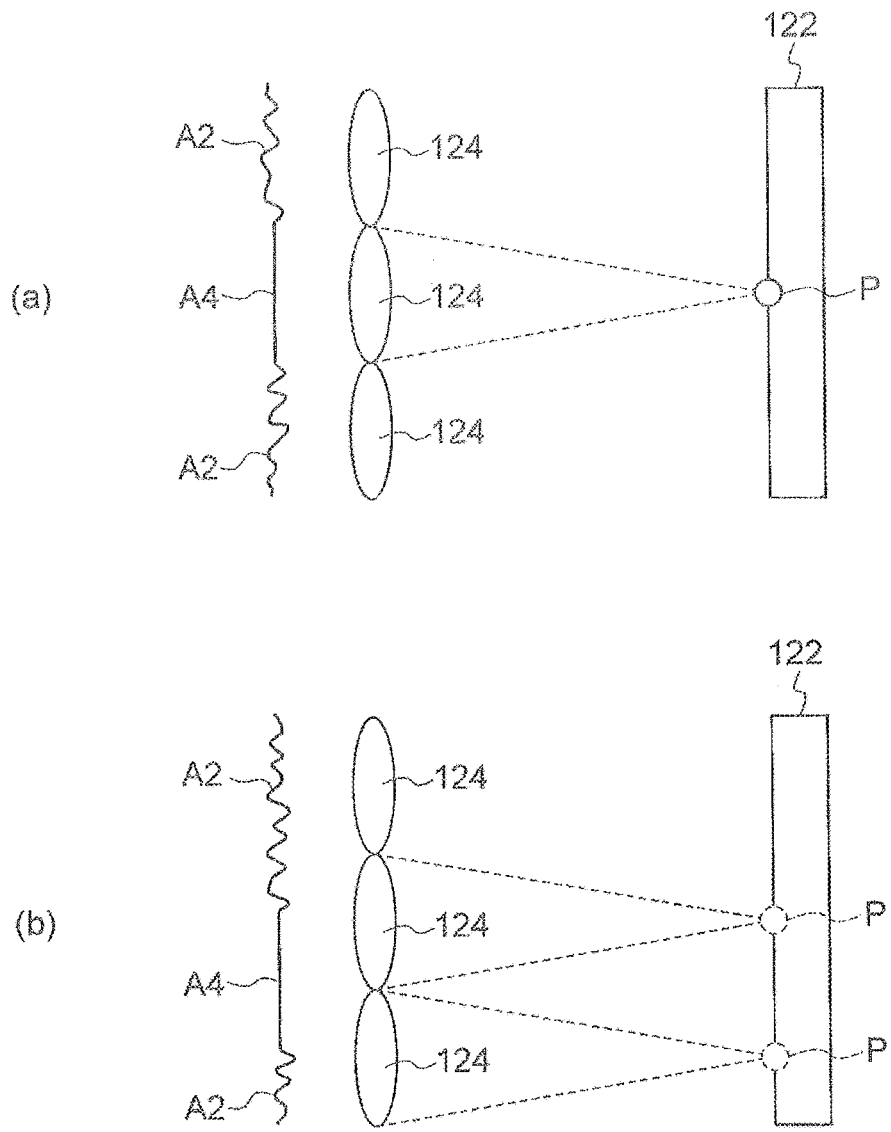
FIG. 10 is an enlargement diagram of the vicinity of the wavefront sensor of FIG. 7.

FIGS. 10(a) and 10(b) are enlargement diagrams of the vicinity of the wavefront sensor 12 of FIG. 7. Because a wavefront part A4 corresponding to the first region B1 completely matches the lens 124 corresponding to the first region B1 when viewed in the optical axis direction if the adjustment of positional displacement between the phase pattern of the wavefront sensor 12 and the spatial light modulator 11 is appropriately performed as illustrated in FIG. 10(a), a full converging spot P (hereinafter, this optical image is referred to as a full converging point image) is formed in the lens 124. On the other hand, a converging spot is not formed or becomes very small in a peripheral lens 124, that is, a lens 124 corresponding to the second region B2.

In contrast, when positional displacement occurs between the phase pattern of the wavefront sensor 12 and the spatial light modulator 11 as illustrated in FIG. 10(b), the wavefront part A4 corresponding to the first region B1 overlaps across the lens 124 corresponding to the first region B1 and a separate lens 124 adjacent to the lens 124 when viewed in the optical axis direction. In this case, the converging spot P formed by the lens 124 corresponding to the first region B1 has a low light intensity and low clarity as compared with the case illustrated in FIG. 10(a) (hereinafter, this optical image is referred to as a partial converging image).

Figure 11:
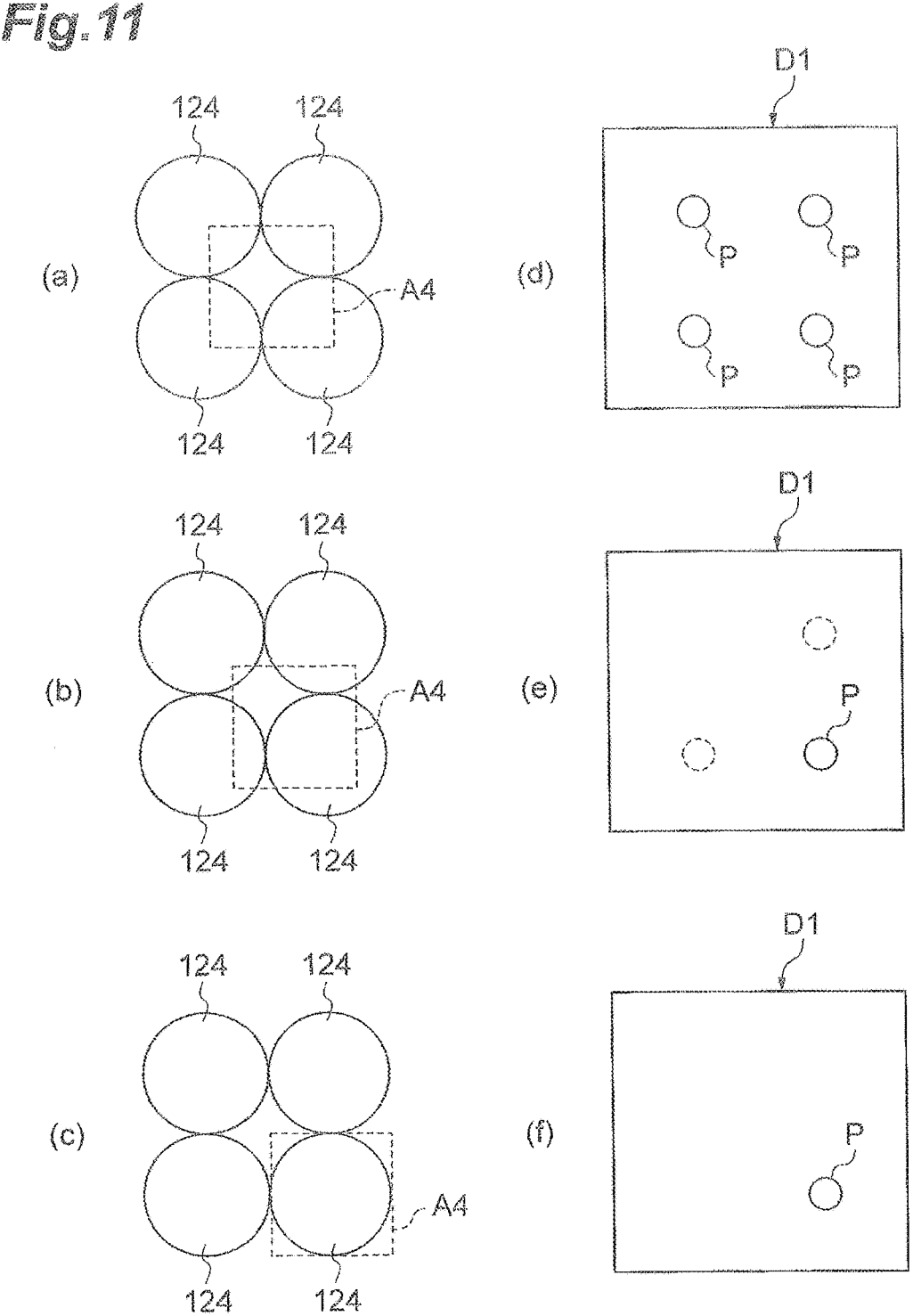
FIG. 11 is a plan view illustrating a simplified positional relation between a wavefront part and a lens viewed in the optical axis direction.

FIGS. 11(a) to 11(c) are plan views illustrating a simplified positional relation between the wavefront part A4 and the lens 124 when viewed in the optical axis direction. In FIGS. 11(a) to 11(c), the wavefront part A4 is illustrated to overlap four lenses 124 adjacent to one another. For example, when the wavefront part A4 is located across the four lenses 124 as illustrated in FIG. 11(a), the light intensity distribution data D1 includes four converging spots P formed by the four lenses 124 as illustrated in FIG. 11(d). When the center of the wavefront part A4 is close to the center of the certain lens 124 further from such a state (FIG. 11(b)), an area of a part in which the three other lenses 124 and the wavefront part A4 mutually overlap is reduced and the converging points P formed by the three other lenses 124 are gradually weakened as illustrated in FIG. 11(e). When the center of the wavefront part A4 completely matches the center of the lens 124 (FIG. 1(c)), the converging spots P formed by the three other lenses 124 disappear or are significantly weakened as illustrated in FIG. 11(f). On the other hand, the converging spot P is formed as the full converging point image in one lens 124.

Therefore, it is possible to know an amount of positional displacement between the wavefront part A4 and the specific lens 124 (that is, an amount of positional displacement between the phase pattern displayed on the spatial light modulator 11 and the wavefront shape measured in the wavefront surface 12) by investigating the distribution of the converging spot P included in the light intensity distribution data D1.

Here, an example of a "spatially non-linear second phase pattern" displayed in the second region B2 of FIG. 8 is shown. FIGS. 12 to 15 are diagrams illustrating examples of such a phase pattern, wherein a magnitude of a phase is shown according to light and shade, a phase of a darkest part is 0 (rad), and a phase of a brightest part is $2\pi$ (rad).

Figure 12:
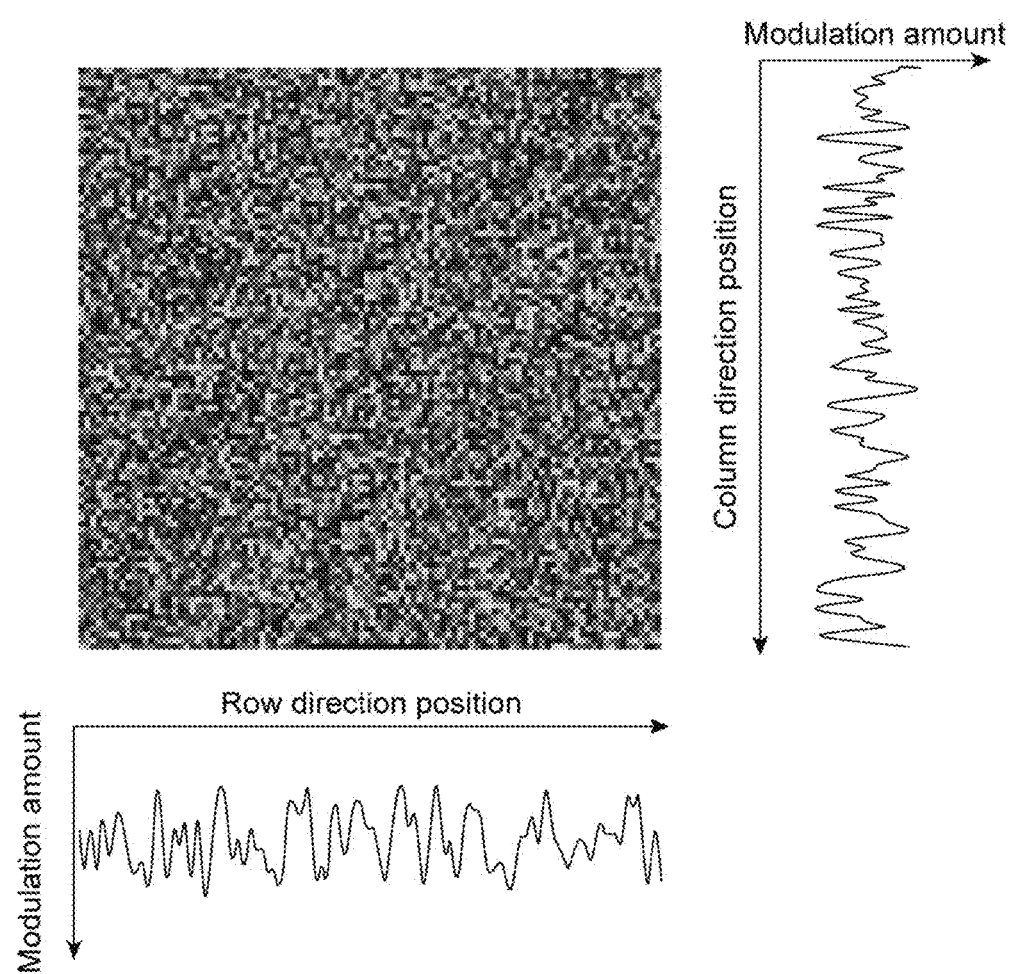
FIG. 12 is a diagram illustrating a random distribution in which a distribution of magnitudes of phases is irregular as an example of a spatially non-linear phase pattern.
Figure 13:
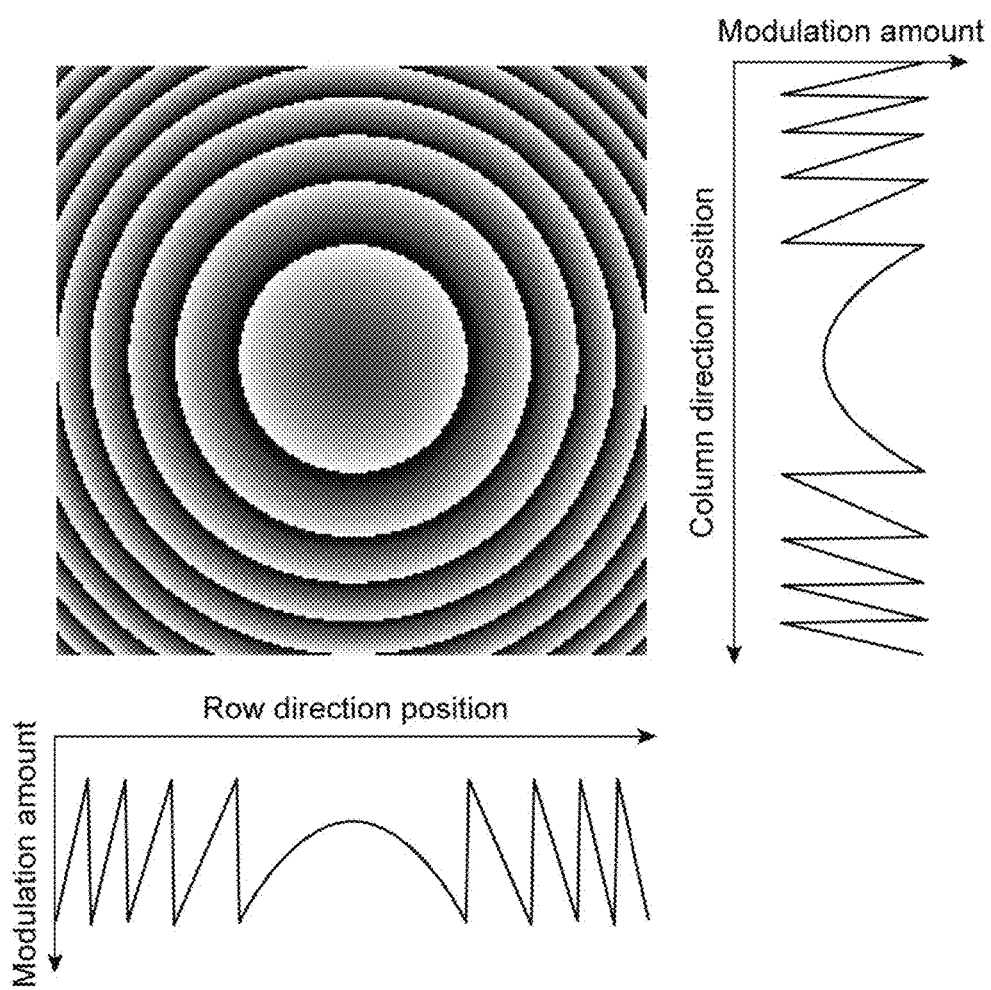
FIG. 13 is a diagram illustrating a defocus distribution which increases a diameter of a converging spot as an example of the spatially non-linear phase pattern.
Figure 14:
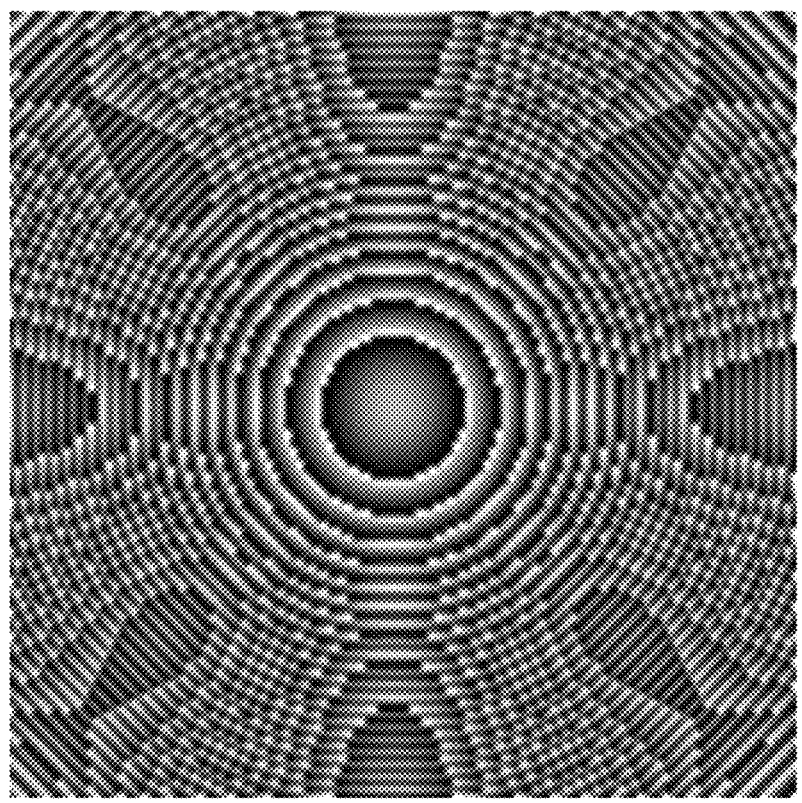
FIG. 14 is a diagram illustrating a distribution which causes a large spherical aberration in an optical image as an example of the spatially non-linear phase pattern.
Figure 15:
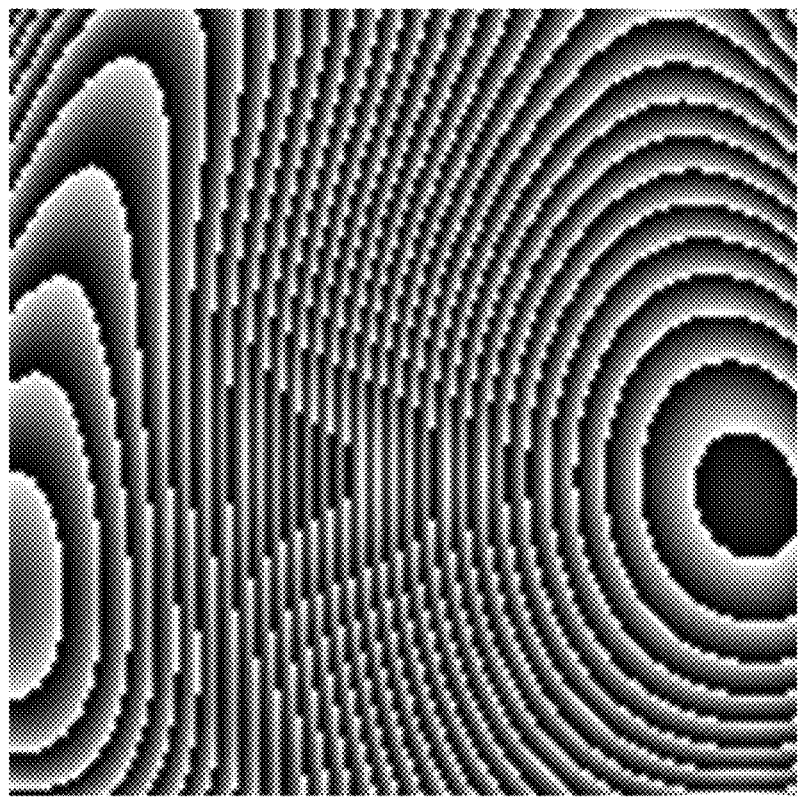
FIG. 15 is a diagram illustrating a distribution which causes a large high-order aberration in the optical image as an example of the spatially non-linear phase pattern.

FIG. 12 illustrates a random distribution in which a distribution of magnitudes of phases is irregular. Also, an example in which a graph of a profile of a phase modulation amount at one position of each of row and column directions is also illustrated in FIG. 12. When this phase pattern is displayed in the second region B2, the optical image La of a relevant part diverges and a clear converging spot P is not formed. FIG. 13 illustrates a defocus distribution which increases a diameter of a converging spot P. Even in FIG. 13, an example of a graph of a phase modulation amount at one position of each of row and column directions is illustrated. When such a phase pattern is displayed in the second region B2, a clear converging spot P is not formed because the optical image La of the relevant part is conversely widened without converging. FIG. 14 illustrates a distribution which causes a large spherical aberration in the optical image La. Instead of the phase pattern in which defocus and spherical aberrations occur, a phase pattern in which a large astigmatic aberration or coma aberration occurs may be used. FIG. 15 illustrates a distribution in which an aberration including a higher-order aberration than a spherical aberration, an astigmatic aberration, or a coma aberration occurs. Even when the phase pattern illustrated in FIG. 14 or 15 is displayed in the second region B2, the clear converging spot P is not formed. The spatially non-linear second phase pattern may include at least one of the above-described distributions or may include a composite pattern in which at least one of the above-described distributions and a linear phase pattern are superimposed.

Figure 16:
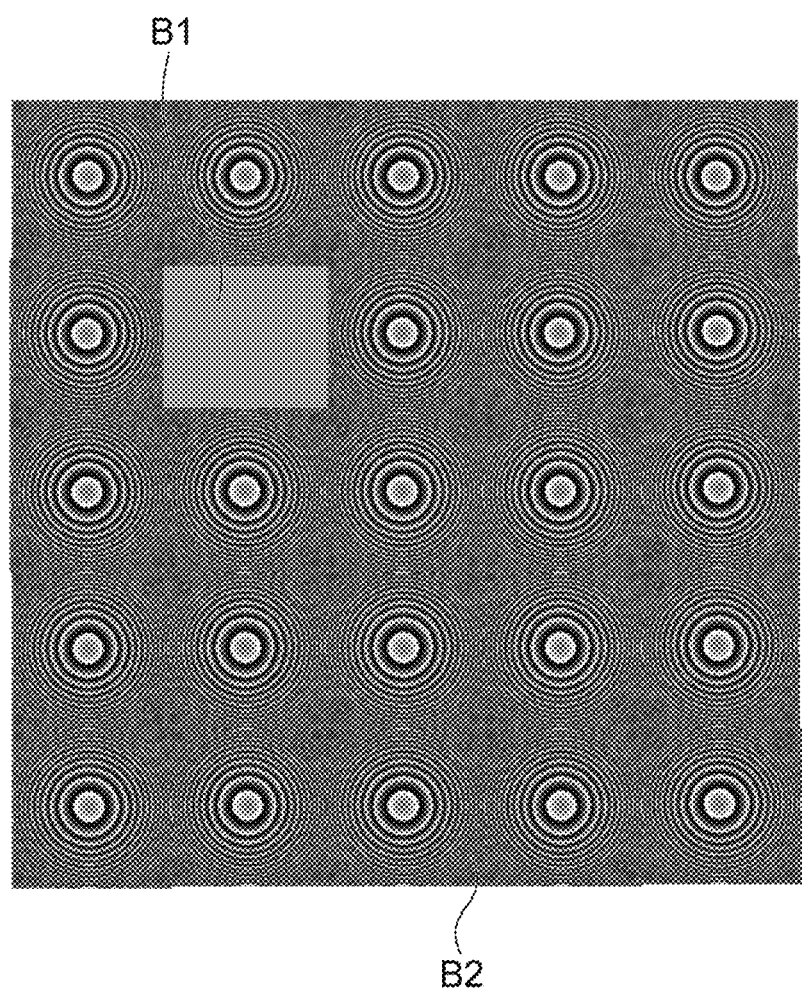
FIG. 16 illustrates an example of a phase pattern in which a common phase distribution (for example, a defocus distribution) is arranged for every two or more regions.
Figure 17:
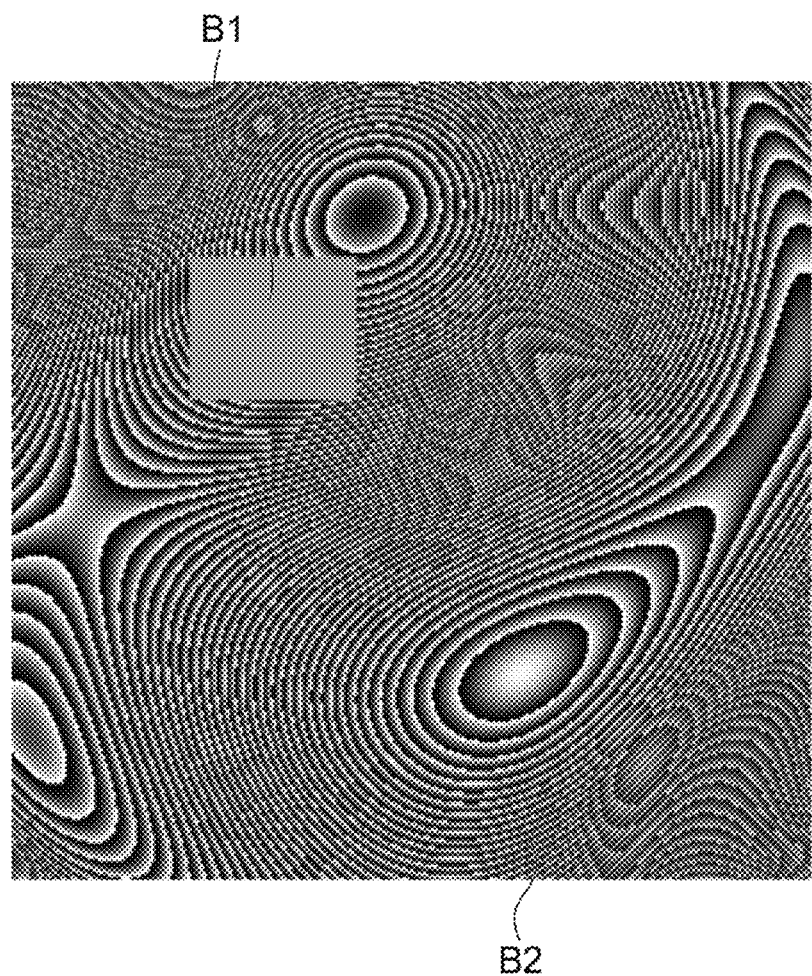
FIG. 17 illustrates an example of a phase pattern in which different phase distributions (for example, phase distributions including a high-order aberration) are arranged for every two or more regions.

Also, the non-linear phase pattern displayed in the second region B2 may include a common phase distribution for every two or more regions formed by dividing the second region B2 and may include different phase distributions for every two or more regions formed by dividing the second region B2. FIG. 16 illustrates an example of a phase pattern in which a common phase distribution (for example, a phase distribution including a high-order aberration) is arranged for every two or more regions formed by dividing the second region B2. Also, FIG. 17 illustrates an example of a phase pattern in which different phase distributions (for example, defocus distributions) are arranged for every two or more regions formed by dividing the second region B2.

Figure 18:
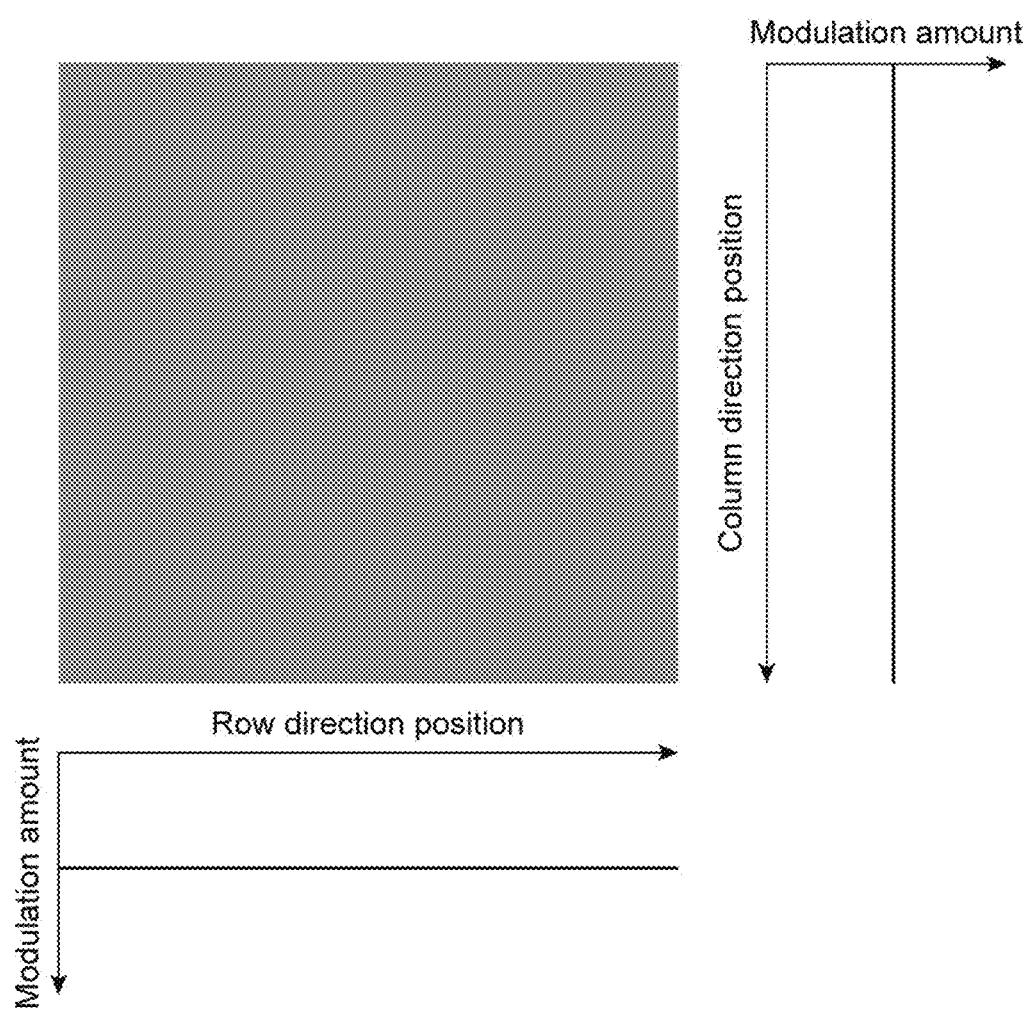
FIG. 18 is a diagram illustrating a phase distribution in which phase values are substantially uniform across the entire surface of the modulation surface as an example of a phase pattern having linearity in at least one direction.

A "first phase pattern having linearity in at least one direction" displayed in the first region B1 of FIG. 8, for example, is implemented by a phase distribution in which phase values are substantially uniform across the entire surface of the modulation surface 11a. FIG. 18 is a diagram illustrating such a phase pattern, wherein the magnitude of the phase is indicated by light and shade as in FIGS. 12 to 17. Because the wavefront of the optical image La of the relevant part is flat when the phase pattern as illustrated in FIG. 18 is displayed in the first region B1, the clear converging spot P is formed by the lens 124.

Figure 19:
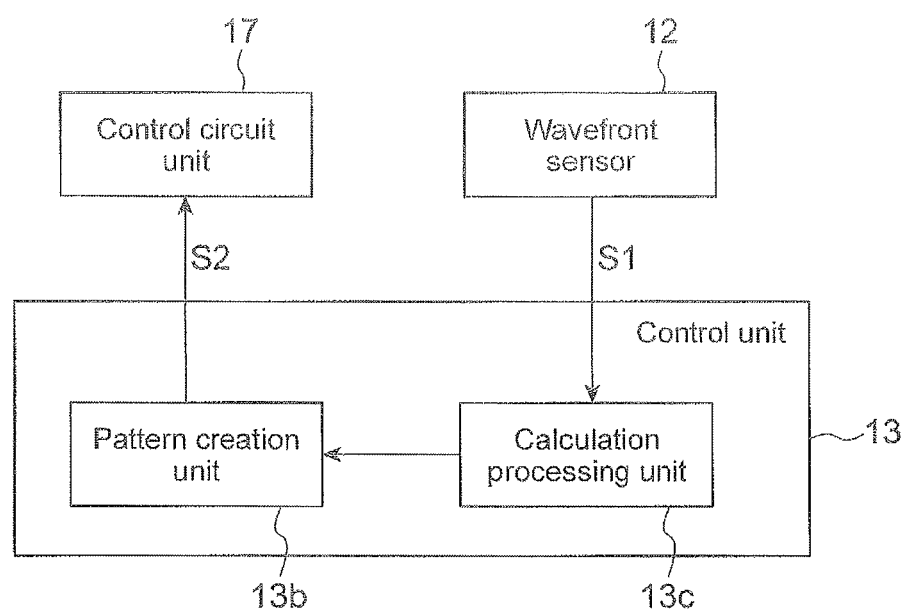
FIG. 19 is a block diagram illustrating an example of an internal configuration of a control unit.

FIG. 19 is a block diagram illustrating an example of an internal configuration of the control unit 13 of this embodiment. The control unit 13 can be configured to include a pattern creation unit 13b and a calculation processing unit 13c. Also, the pattern creation unit 13b and the calculation processing unit 13c are stored as a program inside the storage region 13a of the control unit 13 illustrated in FIG. 1 and implemented by the control unit 13 reading and executing the program.

The pattern creation unit 13b creates a special phase pattern for adjustment (calibration) of a correspondence relation between the modulation surface 11a and the wavefront sensor 12, that is, a phase pattern including the first region B1 and the second region B2. In addition, the pattern creation unit 13b creates a spatially non-linear phase pattern in all regions separately from the above-described phase pattern. Also, these phase patterns are sent to the control circuit unit 17 as the control signal S2 from the pattern creation unit 13b.

Here, a special phase pattern $P_A$ for calibration, for example, is expressed by the following Formula (2).

[Math 2]

$$P_A(n, m) = \begin{cases} a & (n, m) \subset ROI \\ rand() & (n, m) \not\subset ROI \end{cases} \quad (2)$$

Here, a denotes a certain constant and is an example of a first phase pattern having linearity in at least one direction. Also, rand( ) denotes a random function and is an example of a spatially non-linear second phase pattern. (n, m) denotes coordinates in units of pixels on the modulation surface 11a. ROI is defined as a reference sign denoting the first region B1. In addition, a phase pattern $P_B$ which is not spatially linear in all regions is expressed by the following Formula (3).

[Math 3]

$$P_B(n,m) = rand(\ )(n,m) \subset \text{(entire region of modulation surface)} \quad (3)$$

As described above, the first region B1 in this embodiment has a magnitude corresponding to one lens 124. When the plurality of lenses 124 are arranged in a two-dimensional lattice shape as illustrated in FIG. 3 in the lens array 120, the shape of the first region B1 becomes a square. Accordingly, the above Formula (2) can be modified as in the following Formula (4).

[Math 4]

$$P_A(n, m) = \begin{cases} a & |n - xc| \le \frac{w}{2}, |m - yc| \le \frac{w}{2} \\ rand() & |n - xc| > \frac{w}{2}, |m - yc| > \frac{w}{2} \end{cases} \quad (4)$$

Here, (xc, yc) is center coordinates of the first region B1 and w is the number of pixels of one side of the first region B1. Also, assuming that an array pitch of the pixels 11b in the modulation surface 11a is denoted by slmPITCH, an array pitch of the lenses 124 in the lens array 120 is denoted by mlaPITCH, and imaging magnification of an optical system between the modulation surface 11a and the lens surface of the lens array 120 is denoted by M, the number of pixels w of one side of the first region B1 is expressed by the following Formula (5).

[Math 5]

$$w = \frac{1}{M} \times \frac{mlaPITCH}{slmPITCH} \quad (5)$$

In other words, a width (=w×slmPITCH) of the first region B1 in an array direction of the plurality of lenses 124 is (1/M) times the array pitch mlaPITCH of the plurality of lenses 124.

When each of the above-described phase patterns $P_A$ and $P_B$ is displayed on the modulation surface 11a, the calculation processing unit 13c acquires the light intensity distribution data S1 output from the wavefront sensor 12. The calculation processing unit 13c calculates a feature quantity related to the converging spot P included in the light intensity distribution data S1 according to an algorithm that will be described below. The calculation processing unit 13c moves a center position (xc, yc) of the first region B1 so that the feature quantity satisfies a condition (typically, so that the feature quantity is minimized or so that the feature quantity is less than a predetermined threshold value).

Figure 20:
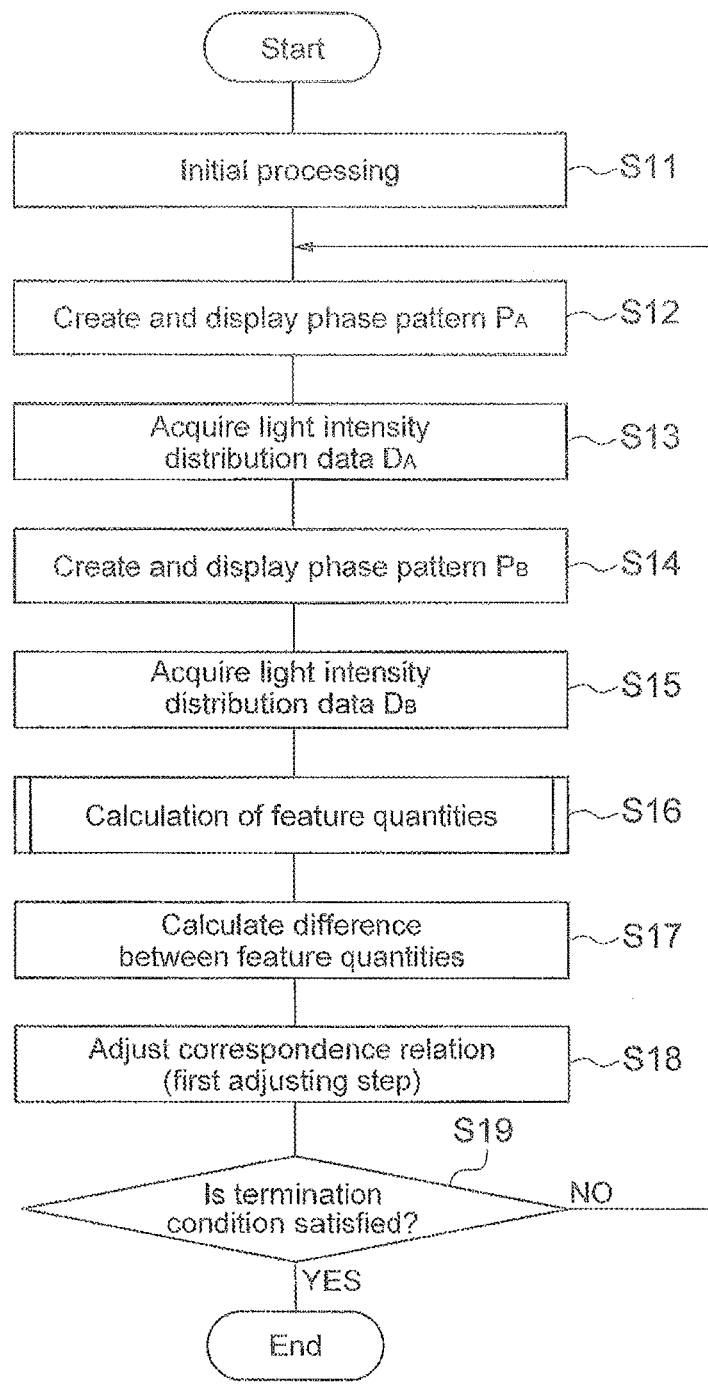
FIG. 20 is a flowchart illustrating an operation and a correspondence relation adjusting method of the adaptive optics system.

An operation of the adaptive optics system 10 including the adjustment (calibration) of the correspondence relation between the modulation surface 11a and the wavefront sensor 12 described above will be described with reference to FIG. 20. FIG. 20 is a flowchart illustrating the operation and correspondence relation adjusting method of the adaptive optics system 10 of this embodiment. Also, the correspondence relation adjusting method is stored as a program for the adaptive optics system inside the storage region 13a of the control unit 13 illustrated in FIG. 1 and the control unit 13 executes the correspondence relation adjusting method by reading the program. Also, the control unit 13 can be mainly constituted of a computer including a CPU, a RAM and a ROM which are main storage apparatuses, a communication module for performing communication, and hardware resources such as an auxiliary storage apparatus such as a hard disk. A program for an adaptive optics system is stored in a storage medium inserted into the computer and accessed or a storage medium provided in the computer. This storage medium, for example, corresponds to a magnetic disc, an optical disc, a CD-ROM, a USB memory, a memory (the storage region 13a) embedded in the computer, or the like.

In the adaptive optics system 10, initial processing of the control unit 13 is first performed (step S11). In this initial processing step S11, for example, securement of a memory region necessary for a calculation process, initial setting of parameters, etc. are performed. In addition, in this step S11, the center of the first region B1 may be designated in any pixel around the center of the modulation surface 11a as an initialization process on a special phase pattern $P_A$ for calibration. In addition, the number of iterations of the subsequent steps S12 to S19 is set. Also, the number of iterations, for example, is set to an integer greater than a value obtained by squaring the number of pixels of one side in the first region B1.

Next, the control unit 13 creates the special phase pattern $P_A$ for the calibration and displays the created phase pattern $P_A$ on the modulation surface 11a (step S12). In this step S12, a phase pattern (for example, see FIG. 18) having linearity in at least one direction is displayed in the first region B1 on the modulation surface 11a for corresponding to one lens 124 of the plurality of lenses 124 of the lens array 120 and a spatially non-linear phase pattern (for example, see FIGS. 12 to 15) is displayed in the second region B2 surrounding the first region B1.

Subsequently, the control unit 13 acquires the light intensity distribution data (hereinafter, this light intensity distribution data is denoted by $D_A$) through the image sensor 122 in a state in which the above-described phase pattern $P_A$ is displayed (step S13, first light intensity distribution acquiring step).

Subsequently, the control unit 13 creates a phase pattern $P_B$ which is not spatially linear in all regions and displays the created phase pattern $P_B$ on the modulation surface 11a (step S14). In this step S14, the spatially non-linear phase pattern (for example, see FIGS. 12 to 15) is displayed in both the first region B1 and the second region B2.

Subsequently, the control unit 13 acquires light intensity distribution data (hereinafter, this light intensity distribution is denoted by $D_B$) through the image sensor 122 in a state in which the above-described phase pattern $P_B$ is displayed (step S15, second light intensity distribution acquiring step).

Subsequently, the control unit 13 obtains a numeric value related to the clarity of the converging spot P included in the light intensity distribution data $D_A$ and a numeric value related to the clarity of the converging spot P included in the light intensity distribution data $D_B$ (step S16). Here, the numeric value related to the clarity of the converging spot P is referred to as a "feature quantity." Hereinafter, a method of obtaining the feature quantity will be described.

Figure 21:
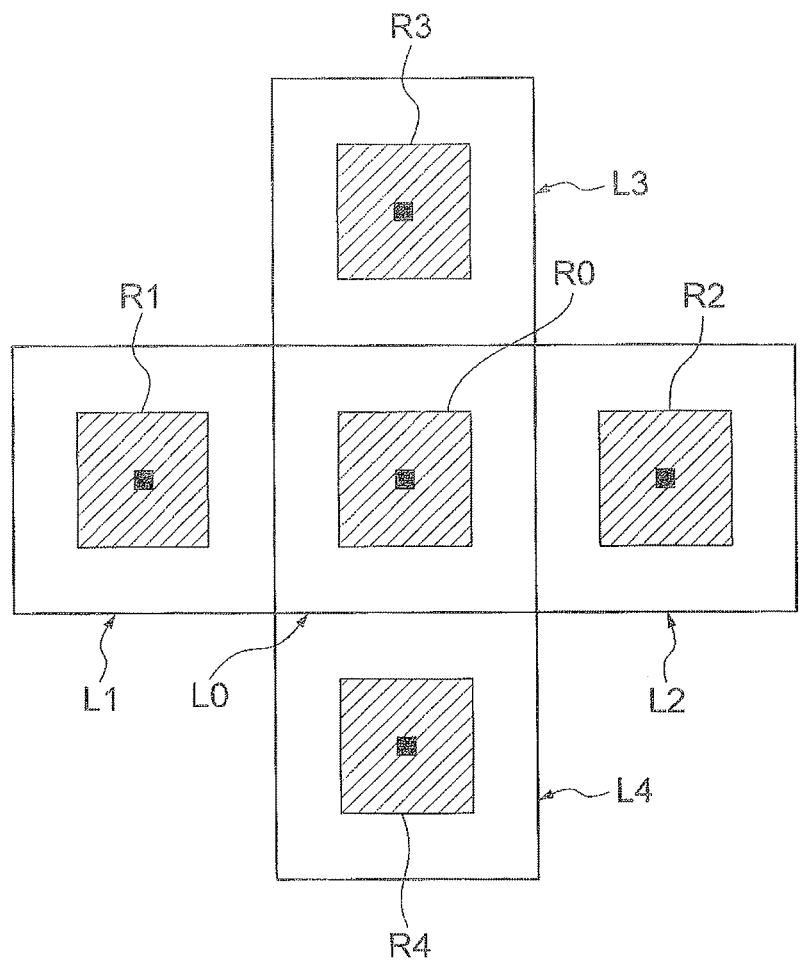
FIG. 21 is a diagram illustrating a rectangular region opposite to one certain lens on an image sensor and rectangular regions opposite to four adjacent lenses around the lens.

FIG. 21 is a diagram illustrating a rectangular region L0 opposite to one certain lens 124 on the image sensor 122 and rectangular regions L1 to L4 opposite to four adjacent lenses 124 around the lens 124. In FIG. 21, the regions L1 and L2 are arranged to flank the region L0 in the row direction and the regions L3 and L4 are arranged to flank the region L0 in the column direction. Also, the number of pixels of one side of each of the regions L1 to L4 and a center interval d between each of the regions L1 to L4 and the region L0 are calculated according to the following Formula (6) from a pitch mlaPITCH of the lens array and a pixel pitch ccdPITCH of the image sensor.

[Math 6]

$$d = \frac{mlaPITCH}{ccdPITCH} \quad (6)$$

In addition, feature quantity calculation regions R0 to R4 are set inside the regions L0 to L4. The feature quantity calculation regions R0 to R4, for example, have similar shapes to the regions L1 to LA and the center positions from the feature quantity calculation regions R0 to R4 match the center positions of the regions L1 to L4.

Figure 22:
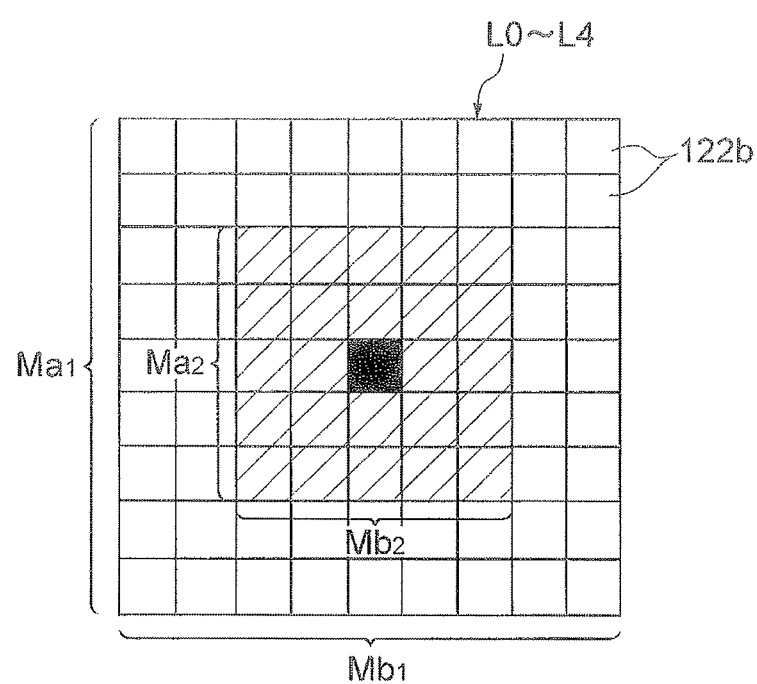
FIG. 22 is an enlargement diagram of each region illustrated in FIG. 21.

FIG. 22 is an enlargement diagram of the regions L0 to L4. The regions L0 to L4 are constituted of a plurality of pixels 122b, and the plurality of pixels 122b are arranged in a two-dimensional lattice shape across $Ma_1$ rows and $Mb_1$ columns ($Ma_1$ and $Mb_1$ are integers greater than or equal to 2). In addition, the feature quantity calculation regions R0 to R4 included in the regions L0 to L4 are indicated by parallel diagonal lines in the drawing and include pixels 122b arranged in a two-dimensional lattice shape across $Ma_2$ rows and $Mb_2$ columns ($Ma_2 < Ma_1$ and $Mb_2 < Mb_1$). A black-filled pixel in the drawing represents one of common center pixels between the regions L0 to L4 and the feature quantity calculation regions R0 to R4.

Figure 23:
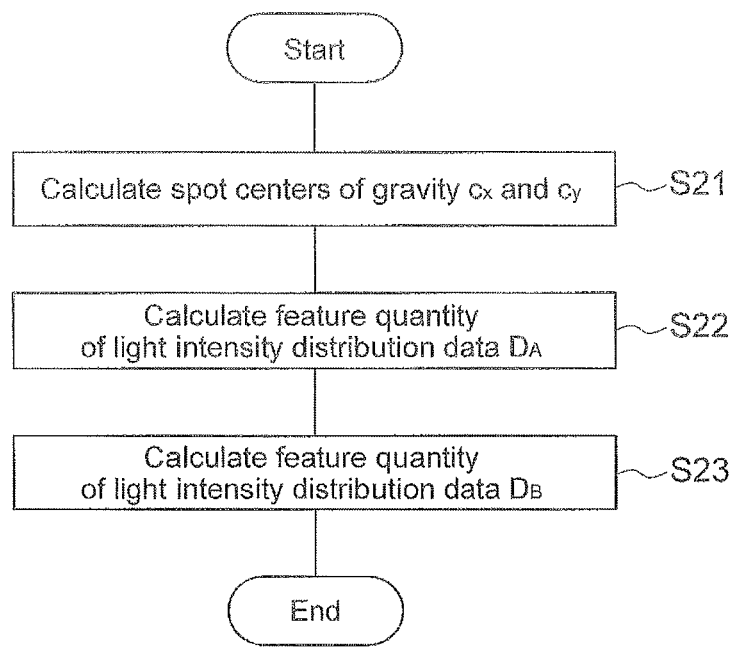
FIG. 23 is a flowchart illustrating a method of calculating a feature quantity of a converging spot.

FIG. 23 is a flowchart illustrating a method of calculating a feature quantity of the converging spot P. When the feature quantity is obtained, a position of the converging spot P in the light intensity distribution data $D_A$ is first detected (step S21). A position ($c_x$, $c_y$) of the converging spot P is expressed by the following Formula (7). Also, $A_{i,j}$ denotes a light intensity at coordinates (i, j) of the light intensity distribution data $D_A$ and R0 denotes a feature quantity calculation region including a peak position of the converging spot P.

[Math 7]

$$c_x = \frac{\sum_{i,j \subset R_0} iA_{ij}}{\sum_{i,j \subset R_0} A_{ij}} \quad (7)$$

$$c_y = \frac{\sum_{i,j \subset R_0} jA_{ij}}{\sum_{i,j \subset R_0} A_{ij}}$$

Because the center of gravity of the converging spot P and the center positions of the region L0 and the feature quantity calculation region R0 match one another in many cases, the center coordinates of the regions L0 and R0 are denoted by ($c_x$, $c_y$). In addition, the center coordinates of the regions L1 and R1 are denoted by ($c_x$−d, $c_y$), the center coordinates of the regions L2 and R2 are denoted by ($c_x$+d, $c_y$), the center coordinates of the regions L3 and R3 are denoted by ($c_x$, $c_y$−d), and the center coordinates of the regions L4 and R4 are denoted by ($c_x$, $c_y$+d).

Next, in the feature quantity calculation regions R1 to R4 of the four regions L1 to L4 adjacent to the region L0 including the peak position of the converging spot P, feature quantities $V_{A1}$, $V_{A2}$, $V_{A3}$, and $V_{A4}$ expressed by the following Formulas (8) are calculated (step S22).

[Math 8]

$$V_{A1} = \sum_{i,j \subset R_1} A_{ij} \quad (8)$$

$$V_{A2} = \sum_{i,j \subset R_2} A_{ij}$$

$$V_{A3} = \sum_{i,j \subset R_3} A_{ij}$$

$$V_{A4} = \sum_{i,j \subset R_4} A_{ij}$$

Subsequently, in the feature quantity calculation regions R1 to R4 in the light intensity distribution data $D_B$, feature quantities $V_{B1}$, $V_{B2}$, $V_{B3}$, and $V_{B4}$ expressed by the following Formulas (9) are calculated (step S23).

[Math 9]

$$V_{B1} = \sum_{i,j \subset R_1} B_{ij}$$

$$V_{B2} = \sum_{i,j \subset R_2} B_{ij}$$

$$V_{B3} = \sum_{i,j \subset R_3} B_{ij}$$

$$V_{B4} = \sum_{i,j \subset R_4} B_{ij} \quad (9)$$

Thus, the feature quantities $V_{A1}$ to $V_{A4}$ of the converging spots P included in the light intensity distribution data $D_A$ and the feature quantities $V_{B1}$ to $V_{B4}$ of the converging spots P included in the light intensity distribution data $D_B$ are calculated.

Description will now return to FIG. 20. Subsequently, as shown in the following Formulas (10), differences $\Delta V_1$ to $\Delta V_4$ between the feature quantities $V_{A1}$ to $V_{A4}$ of the converging spots P included in the light intensity distribution data $D_A$ and the feature quantities $V_{B1}$ to $V_{B4}$ of the converging spots P included in the light intensity distribution data $D_B$ are calculated (step S17, difference calculating step). The symbol $\|$ denotes an absolute value of the difference.

[Math 10]

$$\Delta V_1 = |V_{A1} - V_{B1}|$$

$$\Delta V_2 = |V_{A2} - V_{B2}|$$

$$\Delta V_3 = |V_{A3} - V_{B3}|$$

$$\Delta V_4 = |V_{A4} - V_{B4}| \quad (10)$$

Although calculation is performed using the light intensity distribution data $D_A$ and $D_B$ in the feature quantity calculation formulas (8) and (9) related to the clarity of the above-described converging spot, the calculation may be performed using data after image processing of the light intensity distribution data $D_A$ and $D_B$. In particular, when the calculation is performed using a binarization process which is one of image processing methods, the feature quantity to be calculated indicates a spread of the converging spot. That is, the feature quantity related to the clarity of the converging spot includes a quantity related to the power of the converging spot and a quantity related to the spread of the converging spot.

Subsequently, the control unit 13 adjusts a correspondence relation between the first region B1 of the phase pattern $P_A$ and the region L0 based on the differences $\Delta V_1$ to $\Delta V_4$ obtained in the difference calculating step S17 (step S18, first adjusting step). In this step S18, values $V_x$ and $V_y$ shown in the following Formulas (11) are first calculated.

[Math 11]

$$V_x = |\Delta V_1 - \Delta V_2|$$

$$V_y = |\Delta V_3 - \Delta V_4| \quad (11)$$

The value $V_x$ is an absolute value of a difference between the difference $\Delta V_1$ and the difference $\Delta V_2$ and denotes a balance of the clarity of the converging spots P in the regions L1 and L2 arranged in the row direction to flank the region L0. In addition, the value $V_y$ is an absolute value of a difference between the difference $\Delta V_3$ and the difference $\Delta V_4$ and denotes a balance of the clarity of the converging spots P in the regions L3 and L4 arranged in the column direction to flank the region L0.

Next, the correspondence relation between the modulation surface 11a and the wavefront sensor 12 is adjusted in a direction in which the values $V_x$ and $V_y$ are reduced. For example, when the difference $\Delta V_1$ is less (or greater) than the difference $\Delta V_2$, the first region B1 of the phase pattern $P_A$ is shifted, for example, by one pixel, in the row direction in a direction in which the difference $\Delta V_1$ increases and the difference $\Delta V_2$ decreases (or in a direction in which the difference $\Delta V_1$ decreases and the difference $\Delta V_2$ increases). In addition, when the difference $\Delta V_3$ is less (or greater) than the difference $\Delta V_4$, the first region B1 of the phase pattern $P_A$ is shifted, for example, by one pixel, in the column direction in a direction in which the difference $\Delta V_3$ increases and the difference $\Delta V_4$ decreases (or in a direction in which the difference $\Delta V_3$ decreases and the difference $\Delta V_4$ increases).

After step S18, the control unit 13 determines whether the above-described differences $\Delta V_1$ to $\Delta V_4$ satisfy a predetermined termination condition (step S19). For example, the control unit 13 makes a determination according to whether the values $V_x$ and $V_y$ are minimized or the values $V_x$ and $V_y$ are less than a predetermined threshold value. When the termination condition is determined so that the values $V_x$ and $V_y$ are minimized, the above-described steps S12 to S19 are iterated until the preset number of iterations is reached. Also, because the first region B1 of the phase pattern $P_A$ is shifted by one pixel in this embodiment, a maximum value of the number of iterations is equal to the number of pixels constituting the first region B1. In addition, when the termination condition is determined according to magnitudes of the values $V_x$ and $V_y$ and the predetermined threshold value, the above-described steps S12 to S19 are iterated until the termination condition is satisfied.

When the differences $\Delta V_1$ to $\Delta V_4$ satisfy the predetermined termination condition, the calibration is completed. Also, at the time of assembly or maintenance of the optical system and when the correspondence relation between the spatial light modulator 11 and the wavefront sensor 12 is significantly displaced, the control unit 13 may adjust the correspondence relation between the modulation surface 11a and the wavefront sensor 12 before the above-described calibration (second adjusting step). For example, a relative relation between a mounting position of the wavefront sensor 12 and a mounting position of the spatial light modulator 11 is adjusted so that relative positions of the phase pattern and the wavefront sensor 12 for compensating for wavefront distortion match each other.

Effects obtained by the adjustment method for the adaptive optics system 10, the adaptive optics system 10, the program for the adaptive optics system, and the storage medium storing the program for the adaptive optics system according to this embodiment described above will be described.

In this embodiment, in the first light intensity distribution acquiring step S13, the light intensity distribution data $D_A$ is acquired by the image sensor 122 of the wavefront sensor 12 in a state in which a phase pattern having linearity in at least one direction is displayed in the first region B1 of the spatial light modulator 11 and a spatially non-linear phase pattern is displayed in the second region B2 surrounding the first region B1. Although the converging spot P is formed in the region L0 corresponding to the first region B1 in the light intensity distribution data $D_A$, the converging spot P of the region L0 is not clearly formed and some light from the first region B1 converges on any one of the regions L1 to L4 via the adjacent lens 124 when the first region B1 and the corresponding lens 124 cause positional displacement. In addition, the converging spots P formed in the regions L1 to L4 become clearer when positional displacement is larger. Therefore, it is possible to adjust the correspondence relation between the modulation surface 11a and the wavefront sensor 12 based on the clarity (that is, feature quantities $V_{A1}$ to $V_{A4}$) of the converging spots P in the regions L0 to L4.

Figure 24:
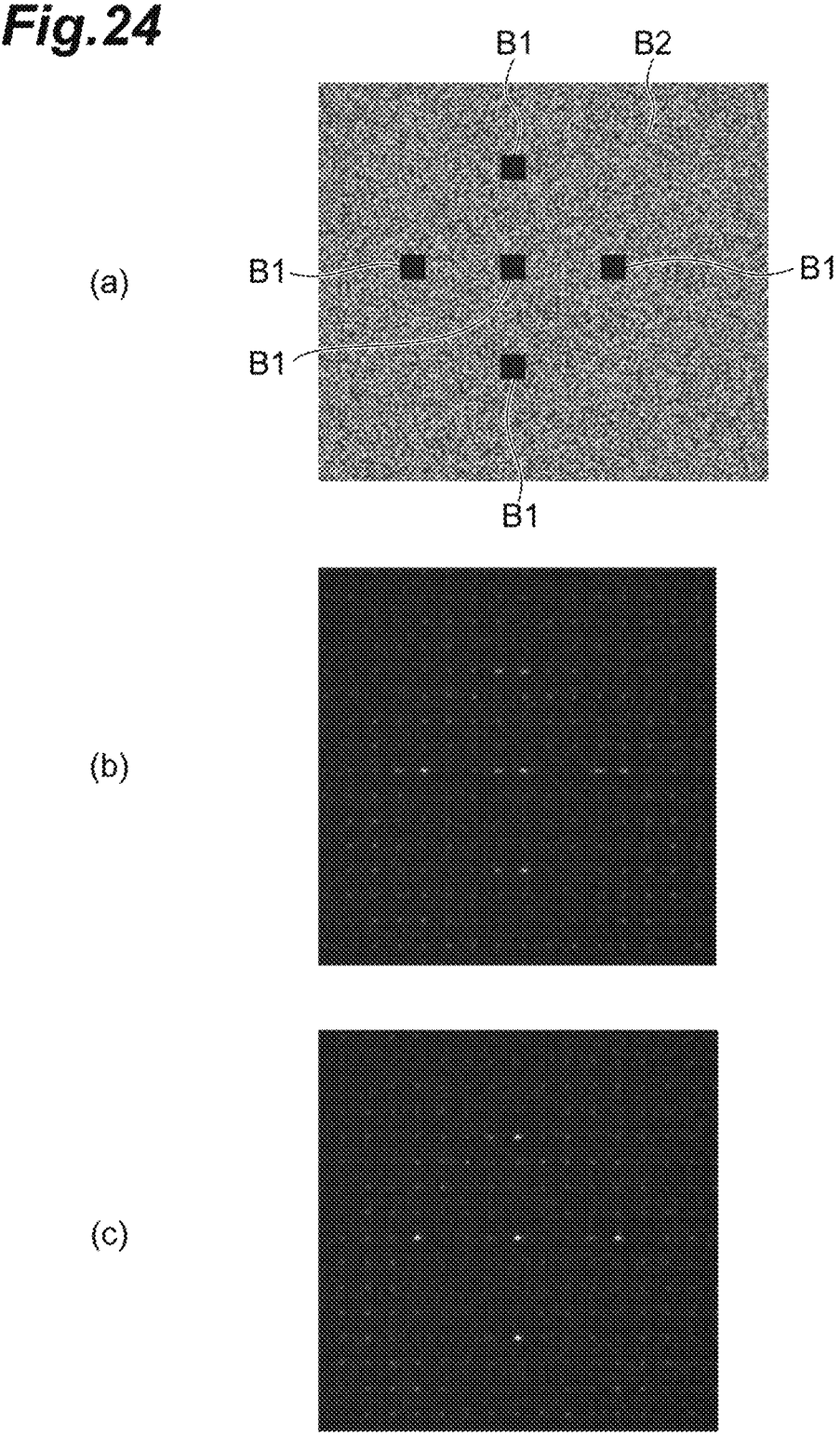
FIG. 24(a) is a diagram illustrating a special phase pattern for calibration as an example.
FIG. 24(b) is a diagram illustrating light intensity distribution data when positional displacement occurs in a lens corresponding to a first region as an example.
FIG. 24(c) is a diagram illustrating light intensity distribution data after calibration with a lens corresponding to the first region as an example.

Here, FIG. 24(a) illustrates a special phase pattern for calibration as an example, FIG. 24(b) illustrates light intensity distribution data $D_A$ when positional displacement occurs in a lens 124 corresponding to the first region B1 as an example, and FIG. 24(c) illustrates light intensity distribution data $D_A$ after calibration with a lens 124 corresponding to the first region B1 as an example. Also, in this example, a plurality of (five in the drawing) first regions B1 are provided. As can be seen from FIG. 24, the converging spot P is diffused and the clarity is lost when positional displacement occurs (FIG. 24(b)), but the converging spot P converges on one point and the clarity is improved after calibration (FIG. 24(c)).

As described above, because the calibration can be performed by only phase pattern control of the spatial light modulator 11 by the control unit 13 and calculation inside the control unit 13 according to this embodiment, it is possible to adjust the correspondence relation between the phase pattern measured in the wavefront sensor 12 and the compensation phase pattern displayed in the spatial light modulator 11 quickly and with high precision.

FIG. 25 is a diagram illustrating a merit according to an increase of precision of adjustment (calibration) of the adaptive optics system. FIG. 25(a) conceptually illustrates an incident wavefront 61, a compensation wavefront 62, and a compensated wavefront 63 (a sum of the incident wavefront 61 and the compensation wavefront 62) when adjustment precision is low as a comparison. In addition, FIG. 25(b) conceptually illustrates an incident wavefront 71, a compensation wavefront 72, and a compensated wavefront 73 (a sum of the incident wavefront 71 and the compensation wavefront 72) when the adjustment precision is high.

As illustrated in FIG. 25(a), distortion of a wavefront is not completely removed in the compensated wavefront 63 when there is positional displacement between the incident wavefront 61 and the compensation wavefront 62 because the adjustment precision is low. Accordingly, an imaging characteristic is likely to be bad and the wavefront distortion may increase due to an influence of feedback control. In contrast, as illustrated in FIG. 25(b), the wavefront distortion can be appropriately corrected and the compensated wavefront 73 can be substantially a plane wave when the adjustment precision is high and positional displacement between the incident wavefront 71 and the compensation wavefront 72 is small.

Also, in the method disclosed in the above-described Non Patent Literature 2, a structure of a phase pattern to be used in calibration is complex and it is difficult to correctly generate a structure of a complex phase pattern through the spatial light modulator 11. On the other hand, in this embodiment, it is only necessary for the phase pattern $P_A$ to include the first and second regions B1 and B2 formed from a simple phase pattern, a structure of the phase pattern is simple, the phase pattern is easily created by the control unit 13, and the structure of the phase pattern can be correctly generated.

In addition, in the method disclosed in Non Patent Literature 2, it is necessary to calculate the entire wavefront shape based on light intensity distribution data output from the wavefront sensor 12. On the other hand, a calculation process is facilitated in this embodiment because it is possible to perform calibration based on only a part of the light intensity distribution data.

Also, in the method disclosed in Non Patent Literature 2, an optical image having a large beam diameter is necessary as an optical image to be radiated to the modulation surface because a size in which the phase pattern to be used in calibration is displayed on substantially the entire modulation surface is desired. On the other hand, because it is only necessary to radiate an optical image to the first region B1 and its peripheral region B2 in this embodiment, it is possible to reduce a beam diameter of the optical image La to be radiated to the modulation surface 11a. Also, it is only necessary for the beam diameter of the optical image La to be three times the diameter of the lens 124 in this embodiment. Because the beam diameter of the optical image La can be reduced as described above, the size of a light source can also be reduced. Thereby, it is possible to more easily perform a calibration operation.

In addition, the modulation surface 11a and the wavefront sensor 12 have an optically mutually conjugate relation, but a difference occurs between the phase pattern displayed on the modulation surface 11a and the phase pattern detected in the wavefront sensor 12 when there is displacement in an optical distance between the modulation surface 11a and the wavefront sensor 12. Accordingly, in the method disclosed in Non Patent Literature 2, the precision of calibration due to the displacement in the optical distance between the modulation surface 11a and the wavefront sensor 12 may be degraded.

On the other hand, even when the modulation surface 11a and the wavefront sensor 12 are slightly displaced from the mutually conjugate positional relation in this embodiment, the calibration precision can be maintained. This is for the following reason. If the phase patterns of the first region B1 and the second region B2 are projected onto the wavefront sensor 12 when the modulation surface 11a and the wavefront sensor 12 are slightly displaced from the mutually conjugate positional relation, the wavefront shape corresponding to the first region B1 becomes a spherical wave because a slight defocus component is added to a linear pattern and the wavefront shape corresponding to the second region B2 remains as a non-linear (for example, random waveform) wavefront. When a part of the spherical wave overlaps a certain lens 124, there is a slight defocus but a clear converging spot P is formed. On the other hand, in the lens 124 overlapping the part of the non-linear wavefront, the converging spot P remains divergent and is not clearly formed. Accordingly, even when there is slight displacement from a positional relation in which the modulation surface 11a and the wavefront sensor 12 are mutually conjugate according to this embodiment, it is possible to sufficiently find a difference between feature quantities of the converging spots P and maintain calibration precision.

In addition, as in this embodiment, it is more preferable that the light intensity distribution data $D_B$ be acquired in a state in which the spatially non-linear phase pattern $P_B$ is displayed in the first and second regions B1 and B2 (step S15), the differences $\Delta V_1$ to $\Delta V_4$ between the feature quantities $V_{A1}$ to $V_{A4}$ of the converging spots P included in the light intensity distribution data $D_A$ and the feature quantities $V_{B1}$ to $V_{B4}$ of the converging spots P included in the light intensity distribution data $D_B$ be calculated (step S17), and the correspondence relation between the modulation surface 11a and the wavefront sensor 12 be adjusted based on the differences $\Delta V_1$ to $\Delta V_4$ in the first adjusting step S18. It is possible to perform calibration more precisely while excluding an influence of noise or the like by adjusting the correspondence relation based on the differences $\Delta V_1$ to $\Delta V_4$.

In addition, as in this embodiment, a width (w×slmPITCH) of the first region B1 in the array direction (the row and column directions) of the plurality of lenses 124 can be configured to be (1/M) times the array pitch mlaPITCH of the plurality of lenses 124. Thereby, because the width of the wavefront part A4 corresponding to the first region B1 matches the diameter of the lens 124 and it is possible to establish clarity differences between the converging spot P in the region L0 illustrated in FIG. 21 and the converging spots P in the peripheral regions L1 to L4, it is possible to perform calibration more precisely. Also, as will be described below, the width of the first region B1 may be ($n_1$/M) ($n_1$ is an integer greater than or equal to 1) times the array pitch mlaPITCH of the plurality of lenses 124. Even in this case, it is possible to have similar effects to the above description.

Also, in this embodiment, light intensity distribution data $D_A$ is acquired in a state in which the phase pattern $P_A$ for the calibration is displayed (step S13) and then the light intensity distribution data $D_B$ is acquired in a state in which the phase pattern $P_B$ which is not spatially linear in all regions is displayed (step S15). However, the acquisition order of the light intensity distribution data $D_A$ and $D_B$ is not limited, but the light intensity distribution data $D_A$ may be acquired after the light intensity distribution data $D_B$ is acquired.

In addition, a form in which a plurality of regular hexagonal pixels are arranged without gaps may be used as the spatial light modulator. In addition, the spatial light modulator using liquid crystal is described as an example in the above-described embodiments, but a spatial light modulator using a material having an electro-optic effect other than the liquid crystal, a spatial light modulator in which a pixel is formed of a micro-mirror, a variable mirror for deforming a film mirror using an actuator, or the like may be used.

First Modified Example

In the above-described embodiment, the differences $\Delta V_1$ to $\Delta V_4$ between the feature quantities $V_{A1}$ to $V_{A4}$ and the feature quantities $V_{B1}$ to $V_{B4}$ calculated from the light intensity distribution data $D_A$ and $D_B$ are obtained after the light intensity distribution data $D_A$ is acquired in a state in which the phase pattern $P_A$ is displayed (step S13) and the light intensity distribution data $D_B$ is acquired in a state in which the phase pattern $P_B$ is displayed (step S15). However, it is also possible to perform calibration based on only the feature quantities $V_{A1}$ to $V_{A4}$.

Figure 26:
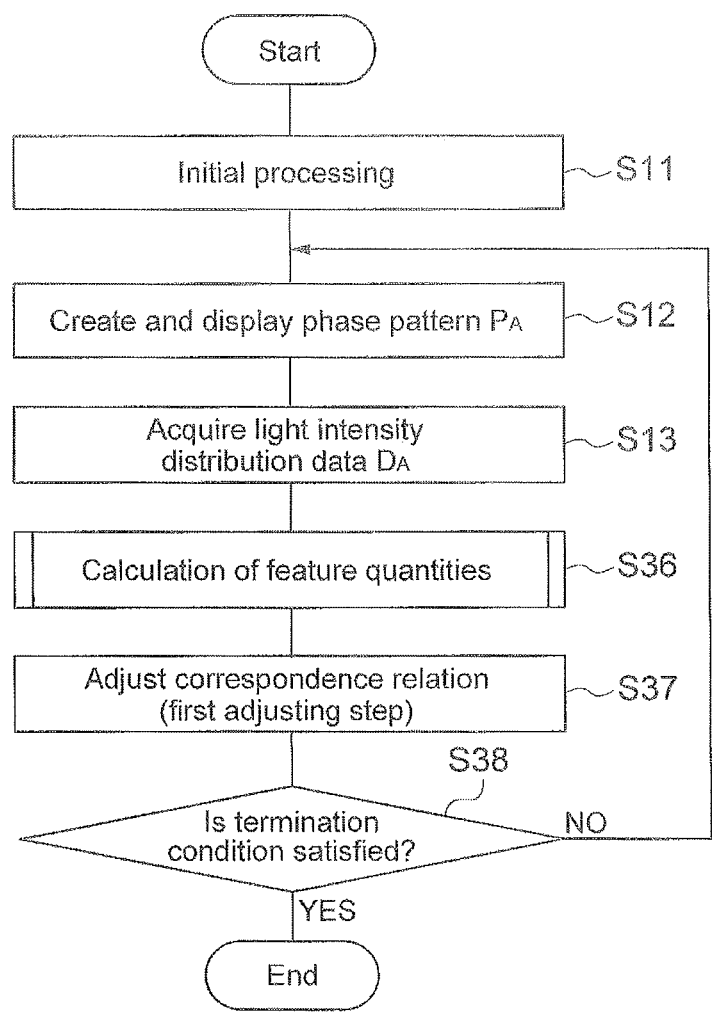
FIG. 26 is a flowchart illustrating an adjustment method (an operation of a control unit) for the adaptive optics system according to a first modified example.

FIG. 26 is a flowchart illustrating an adjustment method (an operation of the control unit 13) for the adaptive optics system 10 according to this modified example. As illustrated in FIG. 26, in this modified example, the control unit 13 performs steps S11 to S13 (see FIG. 20) similar to those of the above-described embodiment. Thereafter, steps S14 and S15 illustrated in FIG. 20 are omitted and the process proceeds to step S36 for feature quantity calculation. A difference of step S36 from step S16 of the above-described embodiment is that step S21 (calculation of a spot center of gravity) and step S22 (calculation of the feature quantities $V_{A1}$ to $V_{A4}$) illustrated in FIG. 23 are performed and step S23 (calculation of the feature quantities $V_{B1}$ to $V_{B4}$) is omitted.

Subsequently, the control unit 13 performs a first adjusting step S37 without performing step S17 of the above-described embodiment. In step S37, the control unit 13 adjusts a correspondence relation between the first region B1 of the phase pattern $P_A$ and the region L0 based on the feature quantities $V_{A1}$ to $V_{A4}$ obtained in step S36.

In this step S37, values $V_x$ and $V_y$ shown in the following Formulas (12) are first calculated.

[Math 12]

$$V_x = |V_{A1} - V_{A2}|$$

$$V_y = |V_{A3} - V_{A4}| \qquad (12)$$

The value $V_x$ is an absolute value of a difference between the feature quantity $V_{A1}$ and the feature quantity $V_{A2}$ and denotes a balance of the clarity of the converging spots P in the regions L1 and L2 arranged in the row direction to flank the region L0. In addition, the value $V_y$ is an absolute value of a difference between the feature quantity $V_{A3}$ and the feature quantity $V_{A4}$ and denotes a balance of the clarity of the converging spots P in the regions L3 and L4 arranged in the column direction to flank the region L0.

Next, the correspondence relation between the modulation surface 11a and the wavefront sensor 12 is adjusted in a direction in which the values $V_x$ and $V_y$ are reduced. For example, when the feature quantity $V_{A1}$ is greater (or less) than the feature quantity $V_{A2}$, the first region B1 of the phase pattern $P_A$ is shifted, for example, by one pixel, in the row direction in a direction in which the feature quantity $V_{A1}$ increases and the feature quantity $V_{A2}$ decreases (or in a direction in which the feature quantity $V_{A1}$ decreases and the feature quantity $V_{A2}$ increases). In addition, when the feature quantity $V_{A3}$ is greater (or less) than the feature quantity $V_{A4}$, the first region B1 of the phase pattern $P_A$ is shifted, for example, by one pixel, in the column direction in a direction in which the feature quantity $V_{A3}$ increases and the feature quantity $V_{A4}$ decreases (or in a direction in which the feature quantity $V_{A3}$ decreases and the feature quantity $V_{A4}$ increases).

Thereafter, the control unit 13 determines whether the above-described feature quantities $V_{A1}$ to $V_{A4}$ satisfy a predetermined termination condition (step S38). For example, the control unit 13 makes a determination according to whether the values $V_x$ and $V_y$ are minimized or whether the values $V_x$ and $V_y$ are less than a predetermined threshold value. When the termination condition is determined so that the values $V_x$ and $V_y$ are minimized, the above-described steps S12 to S19 or S12 to S38 are iterated until the preset number of iterations is reached. In addition, when the termination condition is determined according to magnitudes of the values $V_x$ and $V_y$ and the predetermined threshold value, the above-described steps S12 to S19 or S12 to S38 are iterated until the termination condition is satisfied.

When the feature quantities $V_{A1}$ to $V_{A4}$ satisfy the predetermined termination condition, the calibration is completed. Here, the control unit 13 may adjust the correspondence relation between the modulation surface 11a and the wavefront sensor 12 (second adjusting step). Also, the adjustment method in the second adjusting step is similar to that of the above-described embodiment.

In this modified example, the correspondence relation between the modulation surface 11a and the wavefront sensor 12 is adjusted based on clarity (that is, the feature quantities $V_{A1}$ to $V_{A4}$) of the converging spots P included in the light intensity distribution data $D_A$. Even when the feature quantities $V_{A1}$ to $V_{A4}$ are used instead of the differences $\Delta V_1$ to $\Delta V_4$ as described above, it is possible to adjust a correspondence relation between the wavefront measured in the wavefront sensor 12 and the compensation phase pattern displayed in the spatial light modulator 11 quickly and with high precision as in the above-described embodiment. In addition, it is possible to shorten a time required for adjustment because the number of steps in this modified example is less than those in the above-described embodiments.

Second Modified Example

In the above-described embodiments and first modified example, the feature quantities $V_{A1}$ to $V_{A4}$ and the feature quantities $V_{B1}$ to $V_{B4}$ are calculated for the regions L1 to L4 adjacent to the region L0 when the feature quantity is calculated, and calibration is performed based on these feature quantities. However, the calibration may be performed based on the feature quantity for the region L0.

That is, in the feature quantity calculating step S16 illustrated in FIG. 20 in this modified example, the feature quantities $V_{A0}$ and $V_{B0}$ expressed by the following Formulas (13) are obtained instead of the feature quantities $V_{A1}$ to $V_{A4}$ and the feature quantities $V_{B1}$ to $V_{B4}$.

[Math 13]

$$V_{A0} = \sum_{i,j \subset R_0} A_{ij}$$
$$V_{B0} = \sum_{i,j \subset R_0} B_{ij}$$ (13)

In addition, in the subsequent step S17, the difference $\Delta V_0$ expressed by the following Formula (14) is obtained.

[Math 14]

$$\Delta V_0 = |V_{A0} - V_{B0}|$$ (14)

In the first adjusting step S18, the control unit 13 adjusts the correspondence relation between the first region B1 of the phase pattern $P_A$ and the region L0 based on the difference $\Delta V_0$ obtained in the difference calculating step S17. Specifically, in a direction in which the difference $\Delta V_0$ increases, the first region B1 of the phase pattern $P_A$ is shifted, for example, by one pixel, in the row or column direction.

Thereafter, in step S19, the control unit 13 determines whether the above-described difference $\Delta V_0$ satisfies a predetermined termination condition. For example, the control unit 13 performs a determination according to whether the difference $\Delta V_0$ is maximized or whether the difference $\Delta V_0$ is greater than the predetermined threshold value. When the termination condition is determined so that the difference $\Delta V_0$ is maximized, steps S12 to S19 are iterated until the preset number of iterations is reached. In addition, when the termination condition is determined according to magnitudes of the difference $\Delta V_0$ and the predetermined threshold value, the above-described steps S12 to S19 are iterated until the termination condition is satisfied. Also, a process (second adjusting step) of the case in which the difference $\Delta V_0$ satisfies the predetermined termination condition is similar to that of the above-described embodiment.

In this modified example, the correspondence relation between the modulation surface 11a and the wavefront sensor 12 is adjusted based on the difference $\Delta V_0$ instead of the differences $\Delta V_1$ to $\Delta V_4$. Even in this method, as in the above-described embodiment, it is possible to adjust the correspondence relation between the wavefront measured in the wavefront sensor 12 and the compensation phase pattern displayed in the spatial light modulator 11 quickly and with high precision. Also, as in the above-described first modified example, the correspondence relation can be adjusted based on the feature quantity $V_{A0}$ instead of the difference $\Delta V_0$. In this case, it is possible to shorten a time required for adjustment because the number of steps is reduced. In addition, in this modified example, it is preferable to temporally constantly maintain a light intensity of the optical image La incident on the modulation surface 11a.

Third Modified Example

When the correspondence relation between the modulation surface 11a and the wavefront sensor 12 is adjusted in step S18 illustrated in FIG. 20 in the above-described embodiments and modified examples, the first region B1 of the phase pattern $P_A$ is shifted by one pixel in the row direction (or column direction). However, a movement amount of the first region B1 in step S18 is not limited to one pixel. For example, the movement amount of the first region B1 may change according to magnitudes of the values $V_x$ and $V_y$. As an example, the movement amount of the first region B1 for each movement is designated as one pixel when the value $V_x$ is less than a predetermined value and the movement amount of the first region B1 for each movement is designated as two pixels, three pixels, or the like when the value $V_x$ is greater than the predetermined value. Also, when this method is applied to the above-described second modified example, it is possible to determine the movement amount of the first region B1 according to the magnitude of the difference $\Delta V_0$.

The relation between the magnitudes of the values $V_x$ and $V_y$ (or the difference $\Delta V_0$) and the movement amount of the first region B1 for each movement can be determined, for example, by an experiment performed in advance. In this experiment, for example, it is assumed that the wavefront sensor 12 and the spatial light modulator 11 have an appropriate correspondence relation. From this state, the feature quantity is calculated after moving the first region B1 by one pixel in the row or column direction. A graph indicating a correlation between the movement amount (the number of pixels) of the first region B1 and the values $V_x$ and $V_y$ (or the difference $\Delta V_0$) is created. It is possible to determine the movement amount of the first region B1 for each movement from the magnitudes of the values $V_x$ and $V_y$ (or the difference $\Delta V_0$) based on the graph.

According to this modified example, as in the above-described embodiments, it is possible to adjust the correspondence relation between the wavefront measured in the wavefront sensor 12 and the compensation phase pattern displayed in the spatial light modulator 11 quickly and with high precision. In addition, it is possible to shorten a time required for adjustment of the correspondence relation by changing the movement amount of the first region B1 according to magnitudes of the values $V_x$ and $V_y$ (or the difference $\Delta V_0$).

Fourth Modified Example

In the above-described embodiments and modified examples, the size of the first region B1 is set so that the size of the wavefront part A4 (see FIG. 7) matches a diameter of one lens 124 (see Formula (5)). However, the size of the first region B1 is not limited thereto. Various sizes may be set as follows.

FIG. 27 is a diagram illustrating examples of various sizes of the first region B1. FIGS. 27(a) and 27(b) conceptually illustrate the case in which the size of the first region B1 is set so that the length (the number of pixels) of one side of the region L0 is two times the diameter of the lens 124. Also, in FIG. 27(a), the case in which the length (the number of pixels) of one side of each of the peripheral regions L1 to L4 is set to be equal to the diameter of the lens 124 is illustrated. In FIG. 27(b), the case in which the length (the number of pixels) of a side in contact with the region L0 among four sides of the peripheral regions L1 to L4 is set to be equal to the length of the side of the region L0 and the length (the number of pixels) of a side not in contact with the region L0 is set to be equal to the diameter of the lens 124 is illustrated.

In addition, FIG. 27(c) conceptually illustrates the case in which the size of the first region B1 is set so that the length (the number of pixels) of one side of the region L0 is three times the diameter of the lens 124. In FIG. 27(c), the case in which the length (the number of pixels) of one side of each of the peripheral regions L1 to L4 is set to be equal to the diameter of the lens 124 is illustrated. However, the length (the number of pixels) of a side in contact with the region L0 may be set to be equal to the length of the side of the region L0 as illustrated in FIG. 27(b).

In addition, FIG. 27(d) illustrates an example in which the length of the row direction and the length of the column direction of the first region B1 are different from each other. In this case, the length of the row direction and the length of the column direction of the region L0 are different from each other. Also, it is possible to arbitrarily combine the shape illustrated in FIG. 27(a), the shape illustrated in FIG. 27(b), etc., for shapes of the peripheral regions L1 to L4.

The shape of the first region B1 according to this modified example can be expressed as follows. That is, assuming that an array pitch of the pixels 11b in the modulation surface 11a is denoted by slmPITCH, an array pitch of the lenses 124 in the lens array 120 is denoted by mlaPITCH, and imaging magnification of an optical system between the modulation surface 11a and the lens surface of the lens array 120 is denoted by M, the number of pixels w of one side of the first region B1 is expressed by the following Formula (15).

[Math 15]

$$w = \frac{n_1}{M} \times \frac{mlaPITCH}{slmPITCH} \quad (15)$$

Here $n_1$ is a natural number. In other words, a width (=w×slmPITCH) of the first region B1 in an array direction of the plurality of lenses 124 can be ($n_1$/M) times the array pitch mlaPITCH of the plurality of lenses 124.

Fifth Modified Example

In the above-described embodiments and modified examples, in step S12 illustrated in FIG. 20, the first phase pattern having linearity in at least one direction is displayed in the first region B1 and the spatially non-linear second phase pattern is displayed in the second region B2. However, even when the first phase pattern having linearity in at least one direction is displayed in the second region B2 and the spatially non-linear second phase pattern is displayed in the first region B1, it is possible to obtain similar effects to the above-described embodiments. Also, in this case, the above-described Formula (2) can be rewritten as follows.

[Math 16]

$$P_A(n, m) = \begin{cases} rand\,() & (n, m) \subset ROI \\ a & (n, m) \not\subset ROI \end{cases} \quad (16)$$

In addition, the above-described Formula (3) is rewritten as follows. Here, a' is a certain constant and is an example of the first phase pattern having linearity in at least one direction.

[Math 17]

$$P_B(n,m)=a'(n,m) \subset WFM \text{ entire region} \quad (17)$$

In this modified example, the converging spot P of the region L0 is less clear and the clarity of the converging spots P of the regions L1 to L4 further increases when the correspondence relation between the modulation surface 11a and the wavefront sensor 12 is more appropriately adjusted. Even in this case, as in step S18 illustrated in FIG. 20, it is possible to adjust the correspondence relation between the modulation surface 11a and the wavefront sensor 12 in a direction in which the values $V_x$ and $V_y$ are reduced.

According to this modified example, as in the above-described embodiment, it is possible to adjust the correspondence relation between the wavefront measured in the wavefront sensor 12 and the compensation phase pattern displayed in the spatial light modulator 11 quickly and with high precision. In addition, because the phase pattern having the linearity can be displayed in all regions other than the first region B1, calibration can be performed in parallel during adaptive optical execution by designating the phase pattern as a phase pattern for compensating for wavefront distortion.

Sixth Modified Example

Although the case in which only one first region B1 is set in the modulation surface 11a has been described in the above-described embodiments and modified examples, the first region B1 may be set at a plurality of positions. Thereby, it is possible to statistically process positional displacement after investigating the positional displacement between a plurality of first regions B1 and the wavefront sensor 12 based on feature quantities calculated in relation to the plurality of first regions B1 and adjust the correspondence relation between the modulation surface 11a and the wavefront sensor 12 with higher precision based on a processing result.

Seventh Modified Example

In the above-described embodiments, a substantially uniform distribution expressed by a constant a (or a') has been shown as an example of a first phase pattern having linearity in at least one direction displayed in the first region B1 (the second region B2 in the fifth modified example). However, the first phase pattern may be a phase distribution inclined in at least one direction (changed linearly). Also, a special phase pattern $P_A$ for calibration including the above-described phase pattern is expressed by the following Formula (18).

[Math 18]

$$P_A(n, m) = \begin{cases} a + b(n - n_0) + c(m - m_0) & (n, m) \subset ROI \\ rand\,() & (n, m) \not\subset ROI \end{cases} \quad (18)$$

Here, $n_0$ and $m_0$ denote center pixels of the region B1 (ROI) and a, b, and c are constants.

Figure 28:
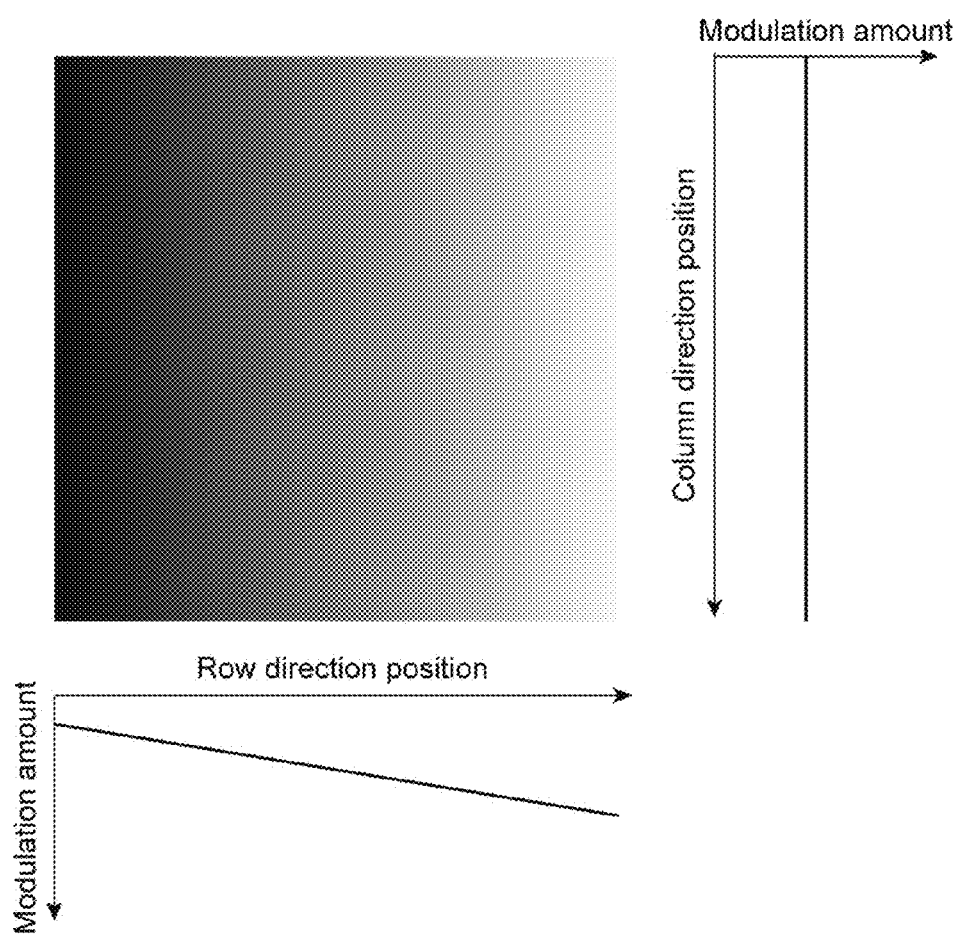
FIG. 28 is a diagram illustrating a phase distribution in which phase values are inclined in a first direction (for example, a row direction) and phase values are substantially uniform in a second direction (for example, a column direction) intersecting (orthogonal to) the first direction.
Figure 29:
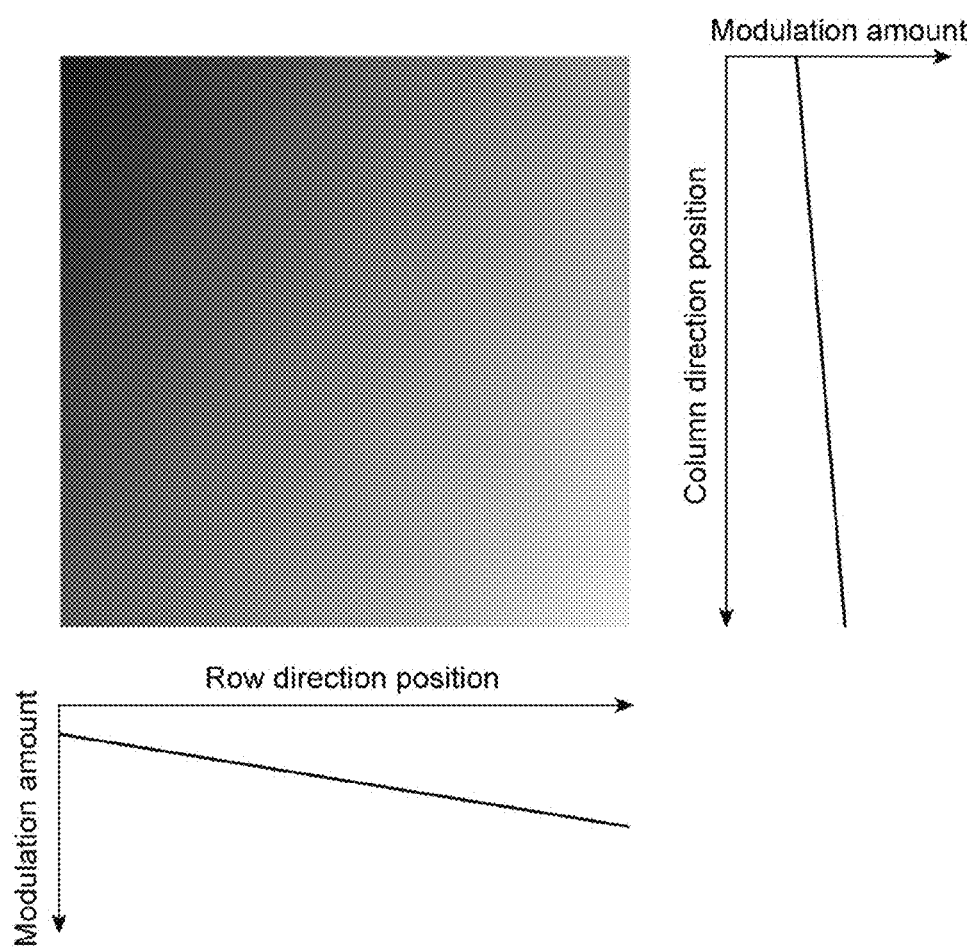
FIG. 29 is a diagram illustrating a phase distribution in which phase values are inclined in both the first direction (for example, the row direction) and the second direction (for example, the column direction).

FIG. 28 illustrates a phase distribution in which phase values are inclined in a first direction (for example, a row direction) and phase values are substantially uniform in a second direction (for example, a column direction) intersecting (for example, orthogonal to) the first direction. This is a phase distribution in ROI of the case in which $b \approx 0$ and $c=0$ in the above-described Formula (18). Also, FIG. 29 illustrates a phase distribution in which phase values are inclined in both the first direction (for example, the row direction) and the second direction (for example, the column direction). This is a phase distribution in ROI of the case in which $b \neq 0$ and $c \neq 0$ in the above-described Formula (18). Also, a graph of a phase modulation amount in one row and one column in each of the row and column directions is also illustrated in FIGS. 28 and 29. Because the wavefront of the optical image La of the relevant part is flat when these phase patterns are displayed in the first region B1, the clear converging spot P is formed by the lens 124. Accordingly, as in the above-described embodiments and modified examples, it is possible to perform calibration based on clarity of the converging spots P in regions L0 to L4.

However, in this modified example, the center of gravity positions of the converging spots P formed in the regions L0 to L4 are displaced from the center positions of the regions L0 to L4 (that is, on the optical axis of each lens 124) by a slope of the first phase pattern. Accordingly, it is possible to perform similar calculation to the above-described embodiments after moving each of the feature quantity calculation regions R0 to R4 illustrated in FIG. 21 by a displacement amount when the feature quantity is calculated. Also, a displacement amount of the center of gravity position of the converging spot P is uniquely defined based on a configuration parameter of the wavefront sensor 12 and the coefficients b and c. In addition, because it is possible to obtain the original center of gravity position by subtracting the above-described displacement amount from the center of gravity position of the converging spot P, it is possible to perform calibration according to a similar procedure to the above-described embodiments.

Eighth Modified Example

Figure 30:
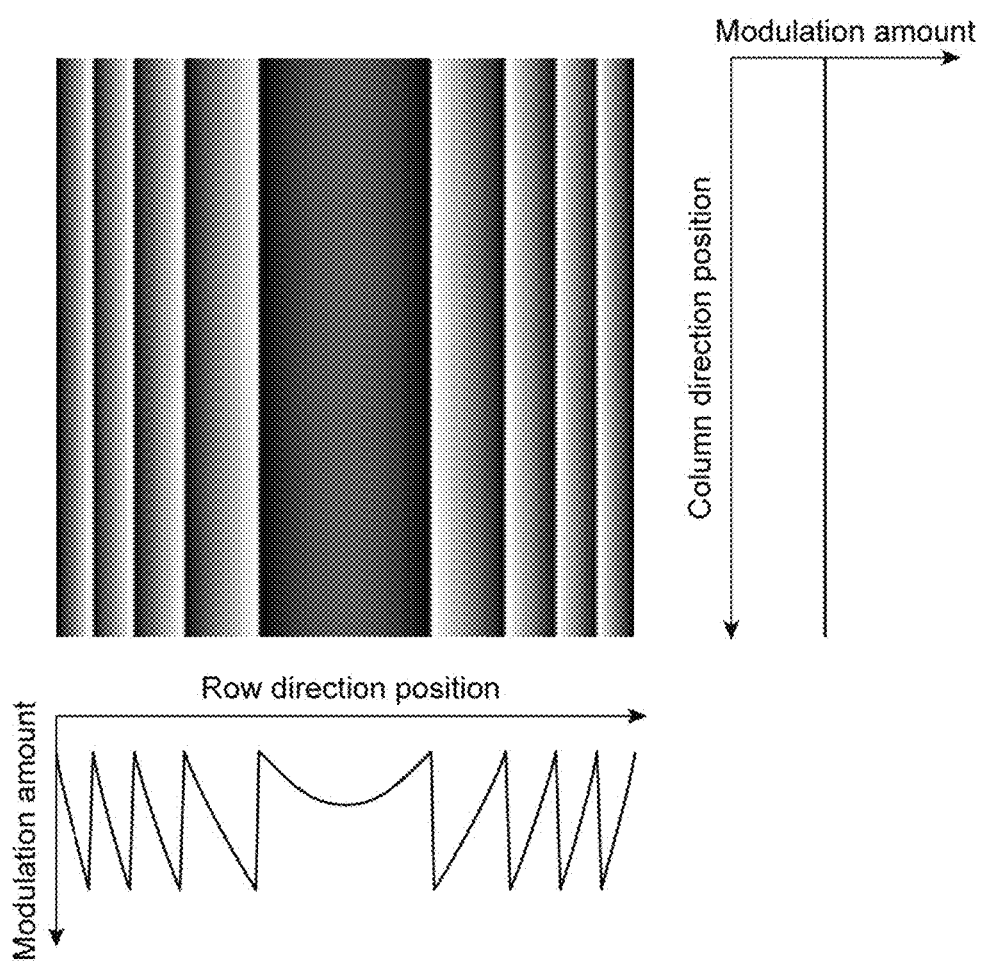
FIG. 30 is a diagram illustrating a phase distribution having a cylindrical lens effect in the first direction and in which phase values are substantially uniform in the second direction as an example of a phase pattern having linearity in at least one direction.

The first phase pattern displayed in the first region B1 (the second region B2 in the fifth modified example) may be a phase distribution having a cylindrical lens effect in a first direction (for example, the row direction) and in which phase values are substantially uniform in a second direction (for example, the column direction) as illustrated in FIG. 30. A special phase pattern $P_A$ for calibration including such a phase distribution is expressed by the following Formula (19).

[Math 19]

$$P_A(n, m) = \begin{cases} a_1 + b_1(n - n_0)^2 & (n, m) \subset ROI \\ rand\,() & (n, m) \not\subset ROI \end{cases} \quad (19)$$

Also, the phase pattern $P_A$ when a phase distribution in which the phase values are substantially uniform in the row direction and which has a cylindrical lens effect in the column direction and has a quadratic function is configured is expressed by the following Formula (20).

[Math 20]

$$P_A(n, m) = \begin{cases} a_1 + c_1(m - m_0)^2 & (n, m) \subset ROI \\ rand\,() & (n, m) \not\subset ROI \end{cases} \quad (20)$$

In the above-described Formulas (19) and (20), $n_0$ and $m_0$ denote center pixels of the first region B1 (ROI) and $a_1$, $b_1$, and $c_1$ denote constants.

When the phase pattern $P_A$ illustrated in Formula (19) is displayed on the modulation surface 11a, the converging spot P extending in the row direction and converging in the column direction is formed in the wavefront sensor 12. Accordingly, it is possible to perform calibration of the column direction using the phase pattern $P_A$ shown in Formula (19). In addition, when the phase pattern $P_A$ illustrated in Formula (20) is displayed on the modulation surface 11a, the converging spot P converging in the row direction and diverging in the column direction is formed in the wavefront sensor 12. Accordingly, it is possible to perform calibration of the row direction using the phase pattern $P_A$ shown in Formula (20). In this modified example, for example, the calibration of the column direction can be performed using the phase pattern $P_A$ shown in Formula (19) and the calibration of the row direction can be performed using the phase pattern $P_A$ shown in Formula (20) before or after the calibration of the column direction.

Ninth Modified Example

Figure 31:
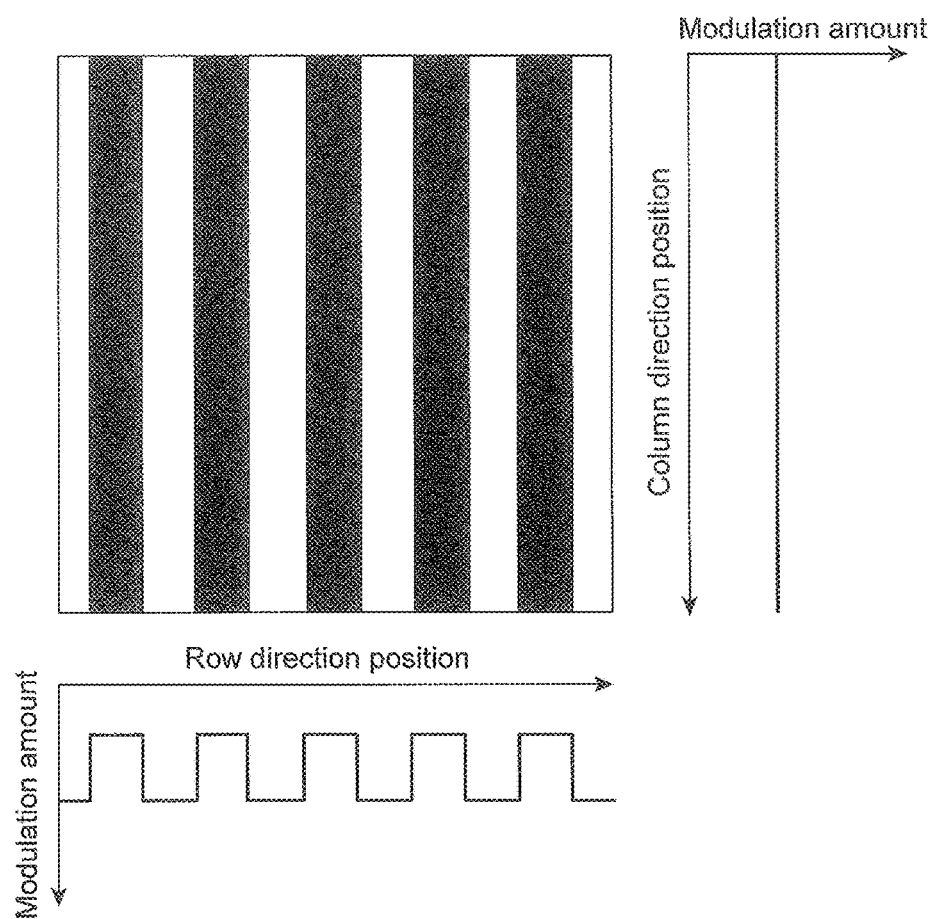
FIG. 31 is a diagram illustrating a phase distribution constituting a diffraction grating in the first direction and in which phase values are substantially uniform in the second direction as an example of a phase pattern having linearity in at least one direction.

The first phase pattern displayed in the first region B1 (the second region B2 in the fifth modified example) may be a phase distribution constituting a diffraction grating in a first direction (for example, the row direction) and in which phase values are substantially uniform in a second direction (for example, the column direction) as illustrated in FIG. 31. When the phase pattern $P_A$ including the first phase pattern illustrated in FIG. 31 is displayed on the modulation surface 11a, a plurality of converging spots P separated in the row direction are formed in the wavefront sensor 12. Accordingly, it is possible to perform the calibration of the column direction using the phase pattern $P_A$. Also, when the calibration of the row direction is performed, it is possible to display the phase pattern $P_A$ including the first phase pattern in which the above-described first direction is designated as the column direction and the above-described second direction is designated as the row direction on the modulation surface 11a.

Tenth Modified Example

The first phase pattern displayed in the first region B1 (the second region B2 in the fifth modified example) may include a composite phase distribution in which the phase distributions shown in the above-described embodiments and seventh to ninth modified examples are superimposed on each other. FIG. 32 is a diagram illustrating an example of the composite pattern obtained by the superimposition. The phase pattern illustrated in FIG. 32(a) is illustrated in FIG. 30 and the phase pattern illustrated in FIG. 32(b) is obtained by rotating the phase pattern illustrated in FIG. 28 90 degrees. The phase pattern illustrated in FIG. 32(c) is a composite pattern obtained by superimposing the phase patterns. The phase pattern illustrated in FIG. 32(c) is a phase pattern of a phase distribution having a quadratic function in a first direction and a linear function in a second direction. When the phase pattern $P_A$ including the composite pattern illustrated in FIG. 32(c) is displayed on the modulation surface 11a, a converging spot P diverging in the row direction and converging in the column direction is formed in the wavefront sensor 12. Accordingly, it is possible to perform the calibration of the column direction using the phase pattern $P_A$. Also, when the calibration of the row direction is performed, the phase pattern $P_A$ including the above-described composite pattern in which the first direction is designated as the column direction and the second direction is designated as the row direction as the first phase pattern can be displayed on the modulation surface 11a.

Eleventh Modified Example

In the above-described embodiments and modified examples, examples of the random distribution (FIG. 12) and the defocus distribution (FIG. 13) are shown as an example of the spatially non-linear second phase pattern displayed in the second region B2 (the first region B1 in the fifth modified example). The second phase pattern is not limited thereto, but it is only necessary for the second phase pattern to have a phase distribution so that a clear converging spot P is not formed. As this phase distribution, for example, there is a Fresnel zone plate (FZP) type phase pattern. The FZP type phase pattern has a function of converging or diverging an incident optical image La having a substantially uniform phase value. Accordingly, when the optical image La converged or diverged by the FZP type phase pattern is incident on the lens 124, the position of the optical axis direction of the converging spot P is displaced from a focal plane of the lens 124 (that is, the surface of the image sensor 122). Thus, a blurred point image is formed in the surface of the image sensor 122.

The special phase pattern $P_A$ for calibration including this FZP type phase pattern is expressed by the following Formula (21).

[Math 21]

$$P_A(n, m) = \begin{cases} a_1 + b_1(n - n_0) + c_1(m - m_0) & (n, m) \subset ROI \\ a_2 + b_2((n - n_k)^2 + (m - m_k)^2) & (n, m) \not\subset ROI \end{cases} \quad (21)$$

Here, $a_2$ denotes a constant and $b_2$ denotes a sufficiently large constant. $(n_k, m_k)$ denotes a center pixel of the second region B2. Also, when $b_2$ is sufficiently large, it is possible to sufficiently separate the converging spot P formed by the lens 124 from the focal plane of the lens 124 (the surface of the image sensor 122).

Twelfth Modified Example

Figure 33:
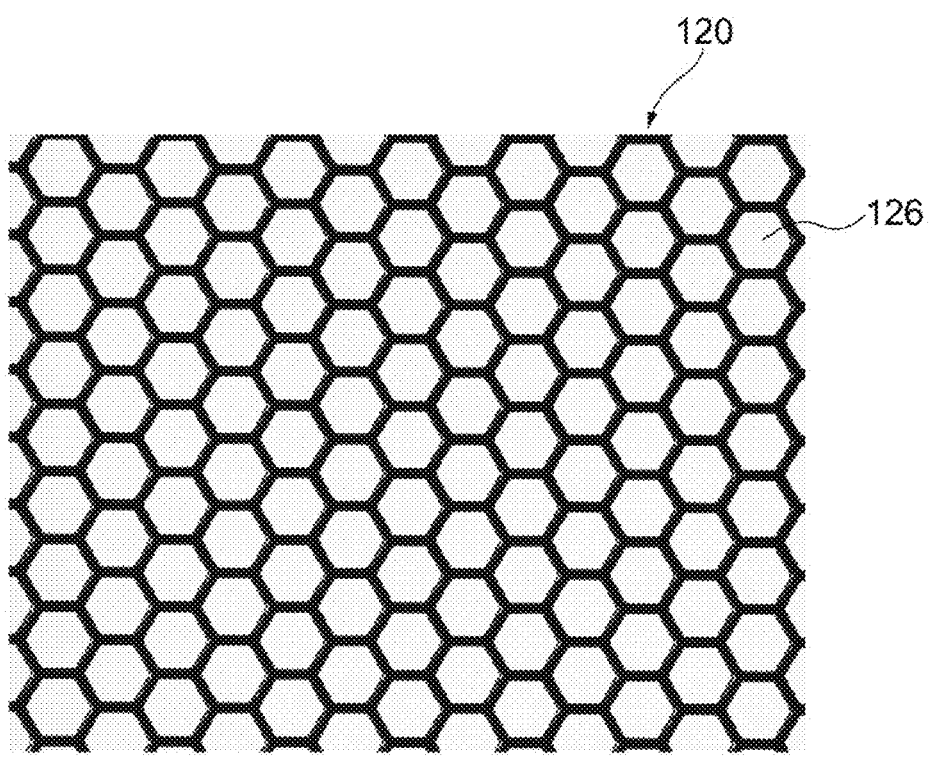
FIG. 33 is a diagram illustrating a modified example of a lens array.
Figure 34:
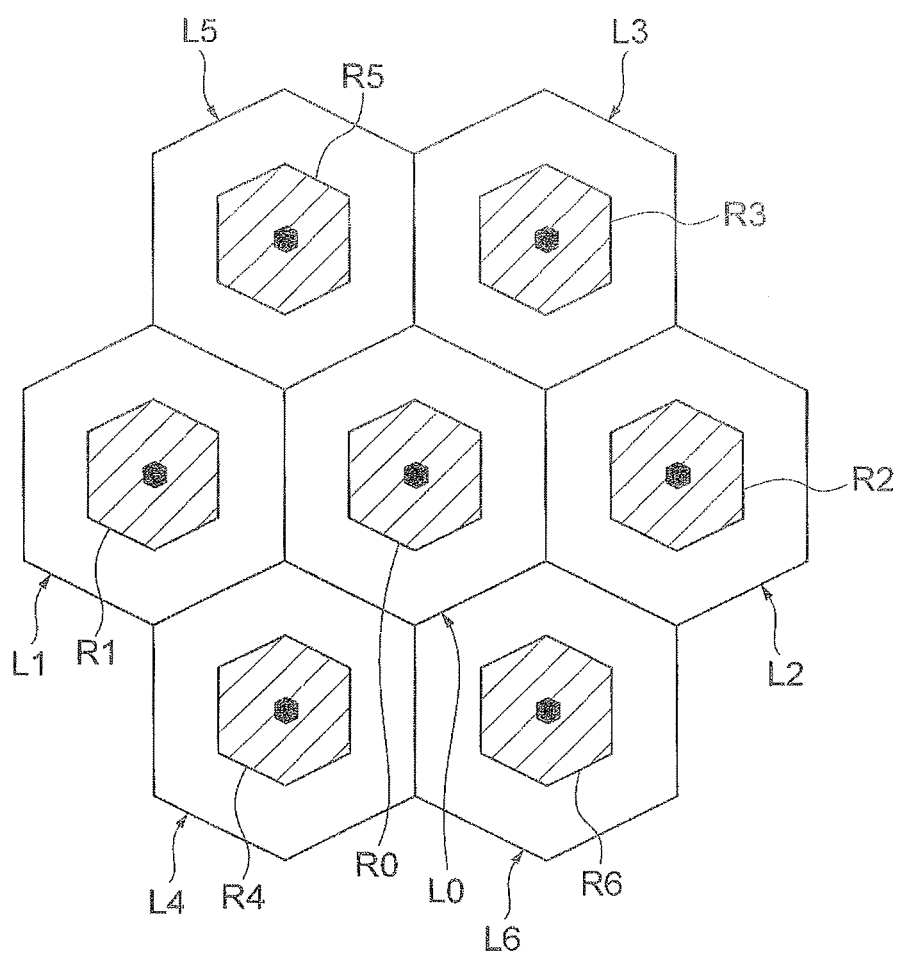
FIG. 34 is a diagram illustrating each region illustrated in FIG. 21 and a modified example of a feature quantity calculation region.

In the above-described embodiments and modified examples, an example of a form in which the plurality of lenses 124 are arranged as the lens array 120 of the wavefront sensor 12 in the two-dimensional lattice shape as illustrated in FIG. 3 is shown. However, the lens array of the wavefront sensor 12 is not limited to such a form. For example, as illustrated in FIG. 33, the lens array 120 may have a honeycomb structure in which a plurality of regular hexagonal lenses 128 are arranged without gaps. Also, in this case, the first region B1 may be set in a hexagonal shape. All of the region L0, the feature quantity calculation region R0 illustrated in FIG. 21, etc., may be set as hexagonal shapes. Further, values corresponding to the values $V_x$ and $V_y$ calculated in step S18 of FIG. 20 are obtained from feature quantities calculated in opposite regions (specifically regions L1 and L2, regions L3 and L4, and regions L5 and L6) which flank the region L0.

Thirteenth Modified Example

Figure 35:
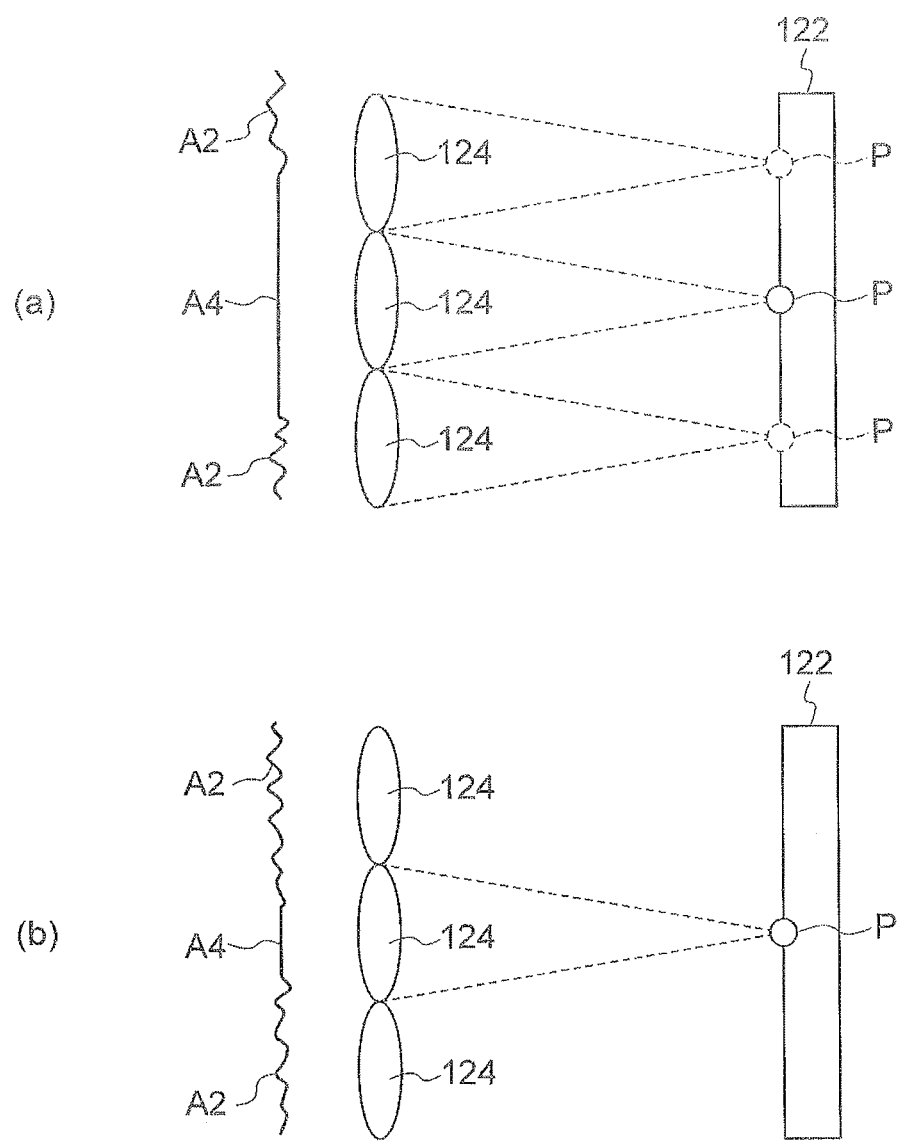
FIG. 35 is an enlargement diagram of the vicinity of the wavefront sensor of FIG. 7.

In the above-described embodiments and modified examples, a size of the wavefront part A4 (see FIG. 10) corresponding to the first region B1 is assumed to be $n_1$ times (here, $n_1$ is a natural number) the diameter of the lens 124. However, $n_1$ may be a real number other than a natural number (for example, 0.8, 1.2, or the like). Here, a relation between the size of the first region B1 and the calibration precision when $n_1$ is a real number will be described. FIG. 35 is an enlargement diagram of the vicinity of the wavefront sensor 12 of FIG. 7. FIG. 35(a) illustrates the case in which the width of the wavefront part A4 corresponding to the first region B1 is slightly larger than the diameter of the one lens 124 and FIG. 35(b) illustrates the case in which the width of the wavefront part A4 is slightly smaller than the diameter of one lens 124.

When the width of the wavefront part A4 is slightly larger than one lens 124 as illustrated in FIG. 35(a), the value $V_x$ (or the value $V_y$) of the above-described embodiment changes because an amount of light incident on the adjacent lens 124 changes according to positional displacement of the wavefront part A4 even when the center position of the wavefront part A4 is close to the center of the lens 124. Accordingly, it is possible to maintain similarly high calibration precision to the above-described embodiment by making the termination determination according to whether the values $V_x$ and $V_y$ are minimized or whether the values $V_x$ and $V_y$ are less than a predetermined threshold value as in the above-described embodiment. On the other hand, because the amount of light incident on the adjacent lens 124 does not change according to the positional displacement of the wavefront part A4 if the center position of the wavefront part A4 is close to the center of the lens 124 when the width of the wavefront part A4 is slightly smaller than the diameter of one lens 124 as illustrated in FIG. 35(b), the value $V_x$ (or the value $V_y$) of the above-described embodiment does not change or only slightly changes. Accordingly, the calibration precision is slightly degraded as compared with the above-described embodiments.

Also, in the cases illustrated in FIGS. 35(a) and 35(b) in the method shown in the second modified example, the calibration precision is slightly degraded as compared with the above-described embodiments because an amount of light incident on the adjacent lens 124 does not change according to positional displacement of the wavefront part A4 if the center position of the wavefront part A4 is close to the center of the lens 124.

From the above, $n_1$ may be greater than 1 when $n_1$ is not a natural number. In addition, in this case, as in the above-described embodiment, it is possible to make the termination determination according to whether the values $V_x$ and $V_y$ are minimized or whether the values $V_x$ and $V_y$ are less than the predetermined threshold value. Also, this form is useful, for example, when imaging magnification M between the spatial light modulator 11 and the wavefront sensor 12 has an error for a design value. In addition, a numeric value estimated through Formula (5) (Formula (15)) is generally valid even in the case of a non-integer. When the numeric value estimated through Formula (5) (Formula (15)) is not an integer, it is only necessary to set a numeric value of an integer greater than the numeric value as the width (the number of pixels) of the first region B1.

Fourteenth Modified Example

Although steps S12 to S18 are iterated while the first region B1 of the phase pattern $P_A$ in step S18 illustrated in FIG. 20 is shifted by one pixel in the above-described embodiment, the following form is also possible. That is, a set of a plurality of values $V_x$ and $V_y$ (equal in number to pixels constituting the first region B1) is pre-acquired by performing steps S12 to S18 before the calibration is performed. During the calibration, steps S12 to S18 are performed only once (until the values $V_x$ and $V_y$ are calculated). The obtained values $V_x$ and $V_y$ are compared with the pre-acquired set of the plurality of values $V_x$ and $V_y$. At this time, for example, a degree of similarity (correlation coefficient) may be calculated between the obtained values $V_x$ and $V_y$ and the pre-acquired set of the plurality of values $V_x$ and $V_y$. Based on the position of the first region B1 when the set of values $V_x$ and $V_y$ closest to the obtained values $V_x$ and $V_y$ is calculated, a correspondence relation between the modulation surface 11a and the wavefront sensor 12 is adjusted. Thereby, it is possible to quickly perform the calibration without iterating steps S12 to S18 illustrated in FIG. 20. Instead of the set of values $V_x$ and $V_y$, a plurality of pieces of light intensity distribution data $D_A$ or feature quantities acquired in advance may be designated as a comparison target.

Fifteenth Modified Example

In the above-described embodiments and modified examples, a maximum value of a displacement width between the first region B1 and the lens 124 corresponding to the first region B1 is ±½ times the number of pixels w of one side of the first region B1. Accordingly, the number of combinations of positional relations between the first region B1 and the lens 124 corresponding to the first region B1 is w×w. Among w×w positional relations, the number of positional relations in which the position of the first region B1 completely matches the position of the lens 124 is only one. In the cases of the (w×w−1) other positional relations, the first region B1 has a specific displacement amount for each positional relation in the row direction, the column direction, or both the row and column directions for the lens 124.

Therefore, in this modified example, in step S12 illustrated in FIG. 20, a calibration phase pattern $P_A$ simultaneously including a plurality of (typically w×w) first regions B1 in which displacement amounts for corresponding lenses 124 are different from each other by one pixel is created and the phase pattern $P_A$ is displayed on the modulation surface 11a. At this time, the array pitch (the number of pixels) of the first region B1 may be set to be (2×w) or more. It is possible to adjust the correspondence relation between the modulation surface 11a and the wavefront sensor 12 based on a displacement amount provided in the first region B1 in which the values $V_x$ and $V_y$ calculated in step S18 are minimized. Thereby, it is possible to quickly perform the calibration without iterating steps S12 to S18 illustrated in FIG. 20.

A center position ($slmX_{i,j}$, $slmY_{i,j}$) of an $(i, j)^{th}$ first region B1 included in the phase pattern $P_A$ in this modified example, for example, is expressed by the following Formula (22).

[Math 22]

$$slmX_{ij}=Pa/2+2iw-i$$

$$slmY_{ij}=Pb/2+2jw-j \quad (22)$$

Here, $i=-w/2, \ldots, w/2-1$ and $j=-w/2, \ldots, w/2-1$. In addition, Pa is the number of pixels of the row direction of the modulation surface 11a and Pb is the number of pixels of the column direction of the modulation surface 11a. Also, the above Formulas (22) show the case in which the width of the wavefront part A4 corresponding to the first region B1 and the diameter of the lens 124 are equal to each other (see Formula (5)).

Figure 36:
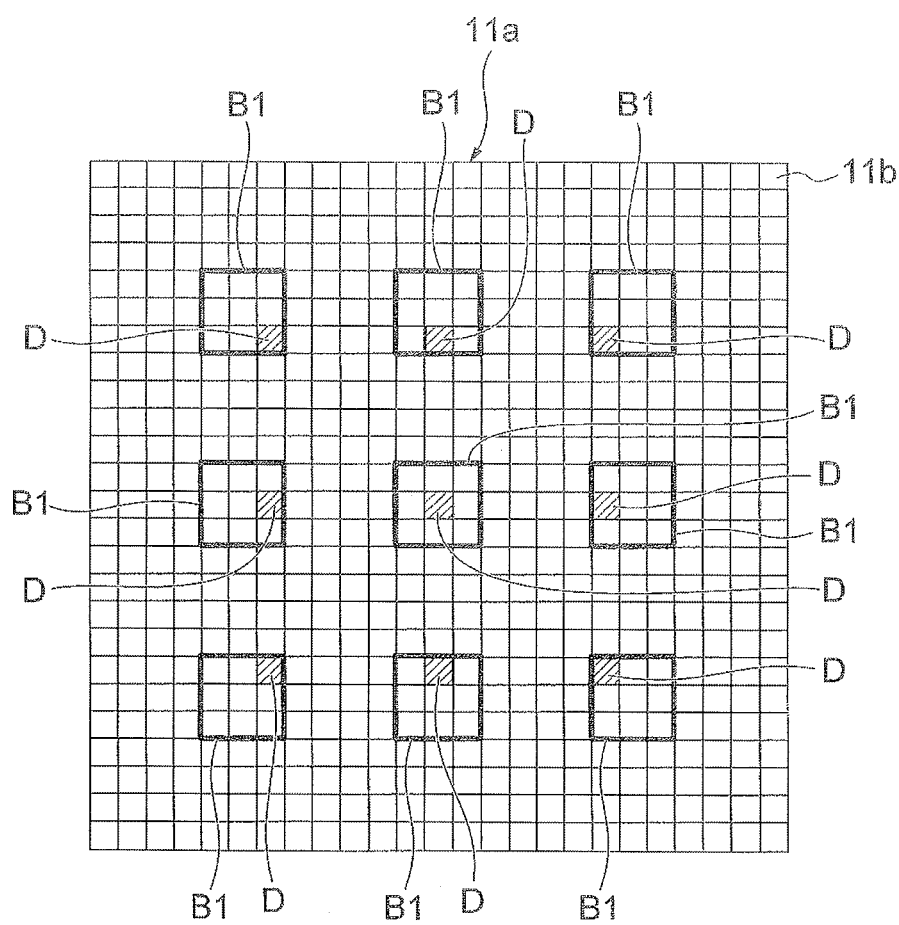
FIG. 36 is a diagram illustrating an arrangement example of a first region.

FIG. 36 is a diagram illustrating an arrangement example of the first region B1 when w=3. In FIG. 36, a region indicated by a thick-bordered box represents a first region B1 and one pixel D inside each first region B1 represents a pixel corresponding to the center of a corresponding lens 124. In this example, the center position of the first region B1 located at the center matches a center position of the corresponding lens 124 and the center positions of eight other first regions B1 are displaced from the center positions of corresponding lenses 124. Accordingly, among nine converging spots P included in the light intensity distribution data $D_A$, only the converging spot P corresponding to the center first region B1 becomes clear and the eight other converging spots P become unclear. In this modified example, it is possible to find a position of the first region B1 in which the converging spot P is clearest (specifically, values $V_x$ and $V_y$ are minimized) and determine a displacement amount between the modulation surface 11a and the wavefront sensor 12 based on the position of the first region B1.

Figure 37:
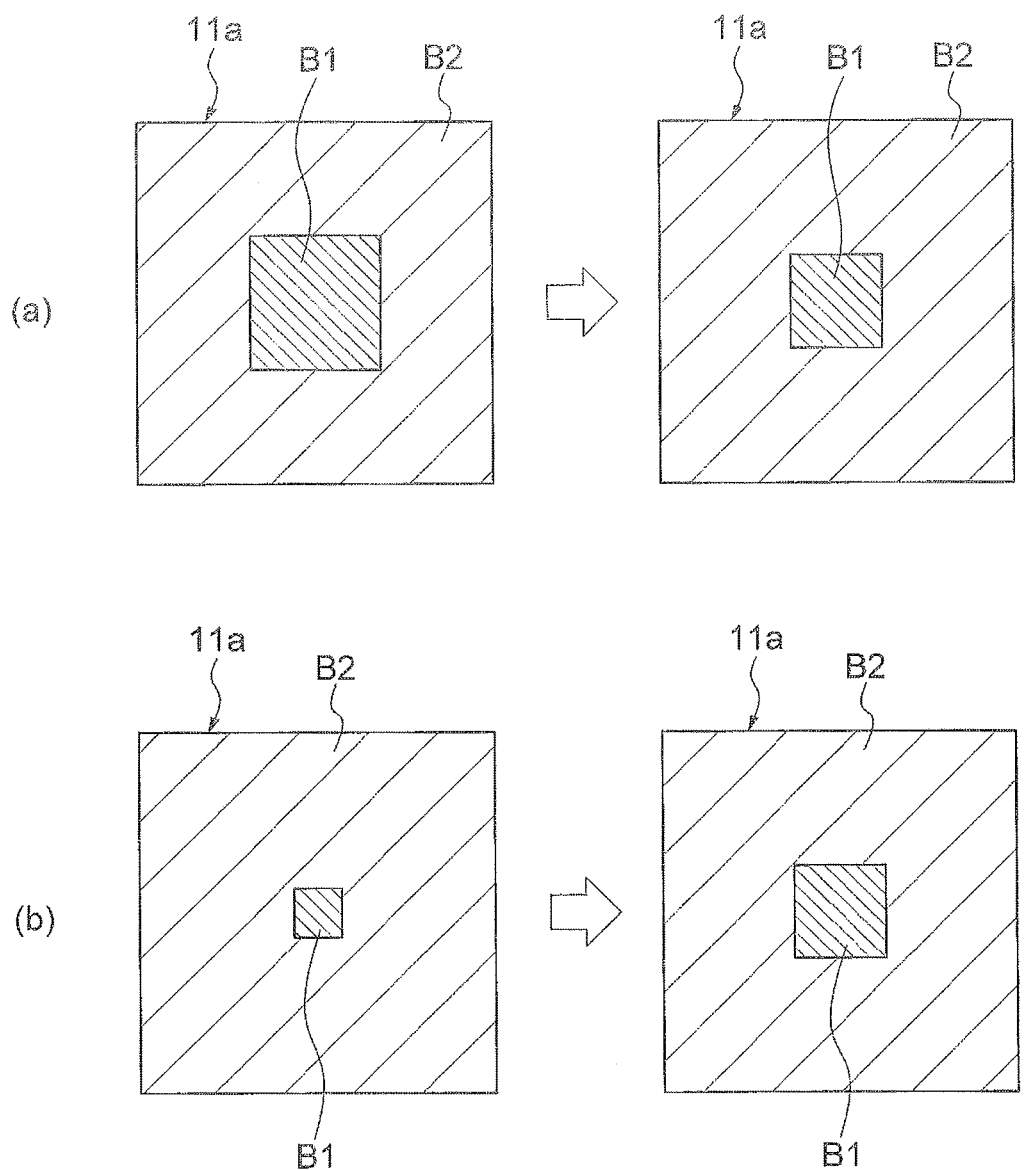
FIG. 37 is a diagram illustrating an example of the case in which a size of the first region is variable.

An adjustment method for an adaptive optics system, an adaptive optics system, a program for an adaptive optics system, and a storage medium storing a program for an adaptive optics system according to an aspect of the present invention are not limited to the above-described embodiments, and various other modifications are possible. For example, although a calibration process is performed by presetting the size of the first region B1 in the above-described embodiments and modified examples, the size of the first region B1 may be variable. FIG. 37 illustrates an example of the case in which the size of the first region B1 is variable. In the example illustrated in FIG. 37(a), the size of the first region B1 is set to be comparatively large and is reduced to an appropriate size (for example, a size corresponding to the diameter of the lens 124) based on the obtained light intensity distribution data. In addition, in the example illustrated in FIG. 37(b), the size of the first region B1 is set to be comparatively small and is enlarged to an appropriate size (for example, a size corresponding to the diameter of the lens 124) based on the obtained light intensity distribution data. As described above, it is possible to set the first region B1 of an appropriate size and perform calibration with higher precision by making the size of the first region B1 variable.

In addition, the case in which the adaptive optics system includes one spatial light modulator in the above-described embodiments and modified examples is shown, but the adaptive optics system may include a plurality of spatial light modulators which are optically coupled in series. In this case, it is possible to perform calibration of one spatial light modulator and a wavefront sensor by causing the one spatial light modulator to display a special phase pattern $P_A$ for calibration and another spatial light modulator to display, for example, a substantially uniform phase pattern. It is possible to perform calibration of all spatial light modulators and a wavefront sensor by performing the above-described operation on each of a plurality of spatial light modulators. In addition, even when the plurality of spatial light modulators are optically coupled in parallel in an adaptive optics system including the plurality of spatial light modulators, it is possible to perform the calibration of all the spatial light modulators and the wavefront sensor and the mutual association between the plurality of spatial light modulators.

INDUSTRIAL APPLICABILITY

According to an adjustment method for an adaptive optics system, an adaptive optics system, a program for an adaptive optics system, and a storage medium storing a program for an adaptive optics system according to an aspect of the present invention, it is possible to adjust a correspondence relation between a phase pattern measured in a wavefront sensor and a compensation phase pattern displayed in a spatial light modulator quickly and with high precision.

REFERENCE SIGNS LIST

10 Adaptive optics system
11 Spatial light modulator
11a Modulation surface
11b Pixel
12 Wavefront sensor
13 Control unit
13a Storage region
13b Pattern creation unit
13c Calculation processing unit
14 Beam splitter
15, 16 Relay lens
17 Control circuit unit
18 Optical detection element
120 Lens array
122 Image sensor
122a Light receiving surface
122b Pixel
124 Lens
B1 First region
B2 Second region
$D_A$, $D_B$ Light intensity distribution data
La Optical image
P Converging spot
$P_A$, $P_B$ Phase pattern
R0 to R4 Feature quantity calculation region

The invention claimed is:

1. An adjustment method for an adaptive optics system, which includes a spatial light modulator configured to spatially modulate a phase of an optical image incident on a modulation surface and a wavefront sensor including a lens array having a plurality of two-dimensionally arranged lenses and an optical detection element for detecting a light intensity distribution including converging spots formed by the lens array and configured to receive the optical image after the modulation from the spatial light modulator and which compensates for wavefront distortion by controlling a phase pattern displayed in the spatial light modulator based on a wavefront shape of the optical image obtained from the light intensity distribution, wherein the correspondence relation between the modulation surface and the wavefront sensor is adjusted, the adjustment method comprising:

a first light intensity distribution acquiring step of acquiring the light intensity distribution through the optical detection element in a state in which one of a first phase pattern having linearity in at least one direction and a spatially non-linear second phase pattern is displayed in a first region on the modulation surface for corresponding to one of the plurality of lenses or two or more lenses adjacent to each other and the other of the first and second phase patterns is displayed in a second region surrounding the first region; and an adjusting step of adjusting the correspondence relation between the modulation surface and the wavefront sensor based on clarity of the converging spot included in the light intensity distribution obtained in the first light intensity distribution acquiring step.

2. The adjustment method for the adaptive optics system according to claim 1, further comprising:

a second light intensity distribution acquiring step of acquiring the light intensity distribution through the optical detection element in a state in which a spatially non-linear phase pattern is displayed in the first and second regions; and a difference calculating step of calculating a difference between a numeric value related to clarity of the converging spot included in the light intensity distribution obtained in the first light intensity distribution acquiring step and a numeric value related to clarity of the converging spot included in the light intensity distribution obtained in the second light intensity distribution acquiring step, wherein the correspondence relation between the modulation surface and the wavefront sensor is adjusted based on the difference obtained in the difference calculating step instead of the clarity of the converging spot included in the light intensity distribution obtained in the first light intensity distribution acquiring step at the time of the adjusting step.

3. The adjustment method for the adaptive optics system according to claim 1, wherein the adjustment of the correspondence relation between the modulation surface and the wavefront sensor in the adjusting step is adjustment of a relative positional relation between position coordinates assumed on the modulation surface when the phase pattern for wavefront distortion compensation is displayed and the wavefront sensor.

4. The adjustment method for the adaptive optics system according to claim 1, wherein the adjustment of the correspondence relation between the modulation surface and the wavefront sensor in the adjusting step is adjustment of a relative relation between a mounting position of the wavefront sensor and a mounting position of the spatial light modulator.

5. The adjustment method for the adaptive optics system according to claim 1, wherein a width of the first region in an array direction of the plurality of lenses is ($n_1$/M) times an array pitch of the plurality of lenses (here, $n_1$ is a natural number and M is imaging magnification of an optical system between the modulation surface and the lens array).

6. The adjustment method for the adaptive optics system according to claim 1, wherein the spatially non-linear phase pattern includes at least one of a random distribution in which a distribution of magnitudes of phases is irregular and a defocus distribution which increases a diameter of the converging spot.

7. The adjustment method for the adaptive optics system according to claim 1, wherein the phase pattern having the linearity in the at least one direction includes at least one of a substantially uniform phase distribution, a phase distribution inclined in at least one direction, a phase distribution which has a cylindrical lens effect in a first direction and is substantially uniform in a second direction intersecting the first direction, and a phase distribution which constitutes a diffraction grating in a first direction and is substantially uniform in a second direction intersecting the first direction.

8. An adaptive optics system comprising:
  a spatial light modulator configured to spatially modulate a phase of an optical image incident on a modulation surface;
  a wavefront sensor including a lens array having a plurality of two-dimensionally arranged lenses and an optical detection element for detecting a light intensity distribution including converging spots formed by the lens array and configured to receive the optical image after the modulation from the spatial light modulator; and
  a control unit configured to compensate for wavefront distortion by controlling a phase pattern displayed in the spatial light modulator based on a wavefront shape of the optical image obtained from the light intensity distribution,
  wherein the control unit acquires the light intensity distribution through the optical detection element in a state in which one of a first phase pattern having linearity in at least one direction and a spatially non-linear second phase pattern is displayed in a first region on the modulation surface for corresponding to one of the plurality of lenses or two or more lenses adjacent to each other and the other of the first and second phase patterns is displayed in a second region surrounding the first region and adjusts a correspondence relation between the modulation surface and the wavefront sensor based on clarity of the converging spot included in the light intensity distribution.

9. A storage medium storing a program for an adaptive optics system, which includes a spatial light modulator configured to spatially modulate a phase of an optical image incident on a modulation surface, a wavefront sensor including a lens array having a plurality of two-dimensionally arranged lenses and an optical detection element for detecting a light intensity distribution including converging spots formed by the lens array and configured to receive the optical image after the modulation from the spatial light modulator, and a control unit configured to compensate for wavefront distortion by controlling a phase pattern displayed in the spatial light modulator based on a wavefront shape of the optical image obtained from the light intensity distribution, wherein the program for the adaptive optics system controls an operation of the control unit, the program for an adaptive optics system causing the control unit to execute:
  a first light intensity distribution acquiring step of acquiring the light intensity distribution through the optical detection element in a state in which one of a first phase pattern having linearity in at least one direction and a spatially non-linear second phase pattern is displayed in a first region on the modulation surface for corresponding to one of the plurality of lenses or two or more lenses adjacent to each other and the other of the first and second phase patterns is displayed in a second region surrounding the first region; and
  an adjusting step of adjusting a correspondence relation between the modulation surface and the wavefront sensor based on clarity of the converging spot included in the light intensity distribution obtained in the first light intensity distribution acquiring step.

* * * * *